(12) United States Patent
Zhang et al.

(10) Patent No.: US 7,693,297 B2
(45) Date of Patent: Apr. 6, 2010

(54) WATERMARK EMBEDDING AND DETECTING METHODS, SYSTEMS, DEVICES AND COMPONENTS

(76) Inventors: Xiao-Ping Zhang, 5831 Rainspring Dr., Mississauga, ON (CA) L5M 6X6; Kan Li, 730 Ontario St., Apt 411, Toronto, ON (CA) M4X 1N3

(*) Notice: Subject to any disclaimer, the term of this patent is extended or adjusted under 35 U.S.C. 154(b) by 1168 days.

(21) Appl. No.: 11/196,526

(22) Filed: Aug. 4, 2005

(65) Prior Publication Data

US 2006/0083403 A1    Apr. 20, 2006

Related U.S. Application Data

(60) Provisional application No. 60/598,832, filed on Aug. 5, 2004.

(51) Int. Cl.
*G06K 9/00* (2006.01)
*G06K 9/36* (2006.01)
(52) U.S. Cl. ..................... 382/100; 382/251
(58) Field of Classification Search ............. 382/100, 382/232, 251, 253; 380/51; 713/176
See application file for complete search history.

(56) References Cited

U.S. PATENT DOCUMENTS 7,046,817 B2 *  5/2006  Kamijoh et al. ............. 382/100
7,058,232 B1 *  6/2006  Miyake ....................... 382/252

* cited by examiner

*Primary Examiner*—Duy M Dang
(74) *Attorney, Agent, or Firm*—Dowell & Dowell, PC

(57) ABSTRACT

Method determining lookup table ("LUT") for embedding watermark. For each quantization cell, calculating probabilities that signal point falls into cell. Selecting cell by probabilities. Setting LUT value to watermark value with largest probability, subject to run constraint. For remaining cells, repeating selecting and setting steps. Other method determining quantization ensemble by calculating probability density function for signal points where the watermark value to be embedded. Distortion and robustness functions are formulated. Given robustness or distortion is selected. Functions optimized, and ensemble of quantizers determined with parameters that comply. Other method quantizing in association with lossy compression. Strength of compression determined. Adapting strength of watermark with strength of compression by a mapping. Other method selecting points for embedding watermark. Determine threshold between large and small signal points using statistical method. Select signal points for embedding according to threshold. Also, processors, computer programs, and systems.

18 Claims, 16 Drawing Sheets

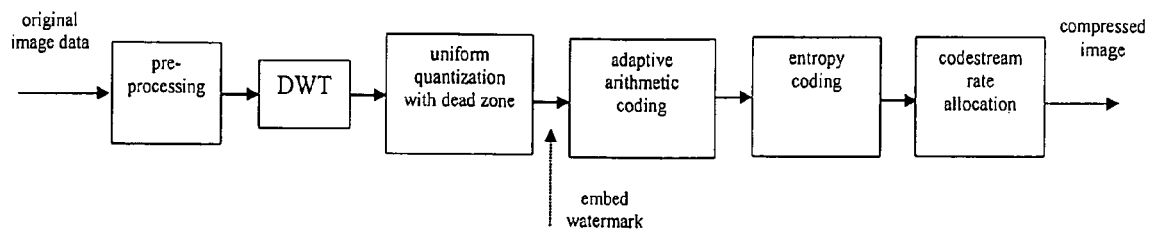
FIG. 27
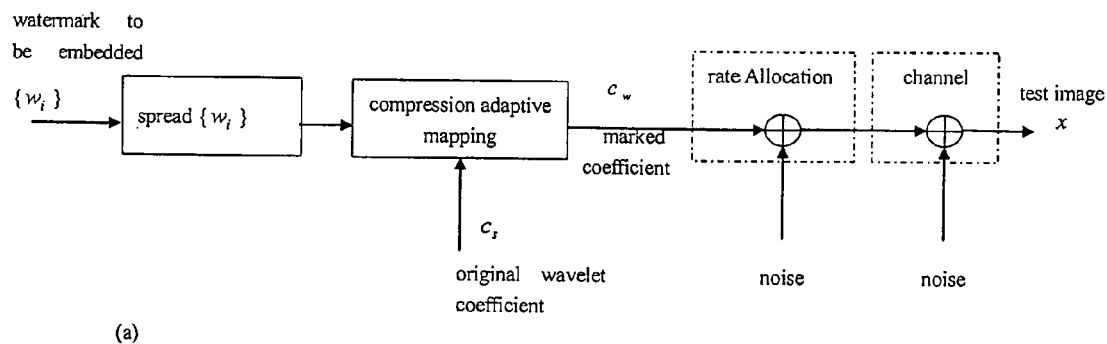
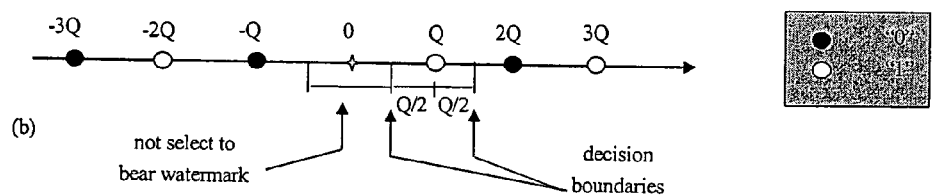
FIG. 29

FIG. 30 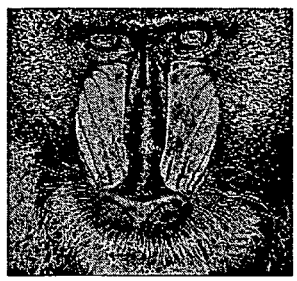 FIG. 31 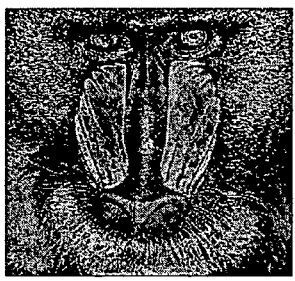 FIG. 32 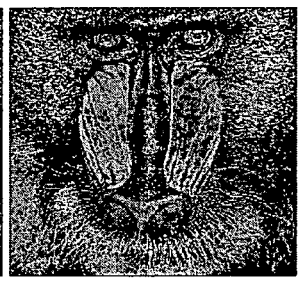 FIG. 33 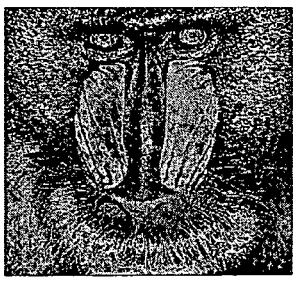
(a) (b) (c) (d)
 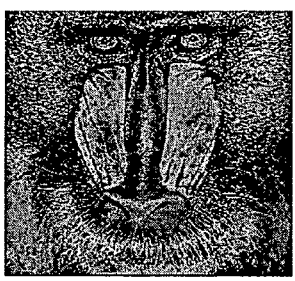 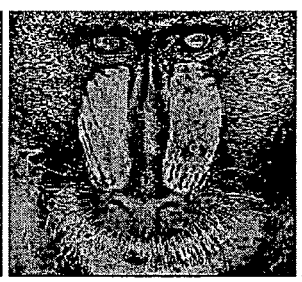 
(e) (f) (g) (h)
FIG. 34  FIG. 35  FIG. 36  FIG. 37

FIG. 38
FIG. 39
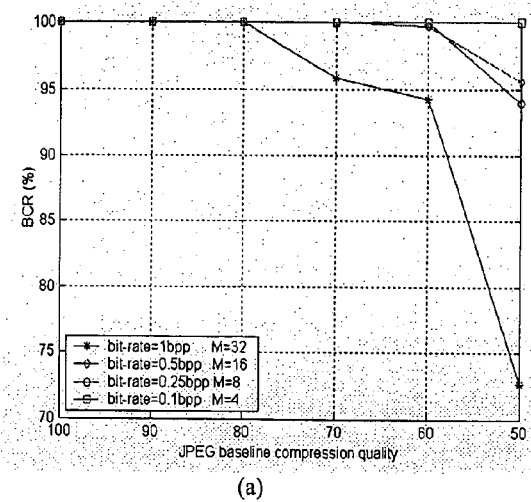
(a)
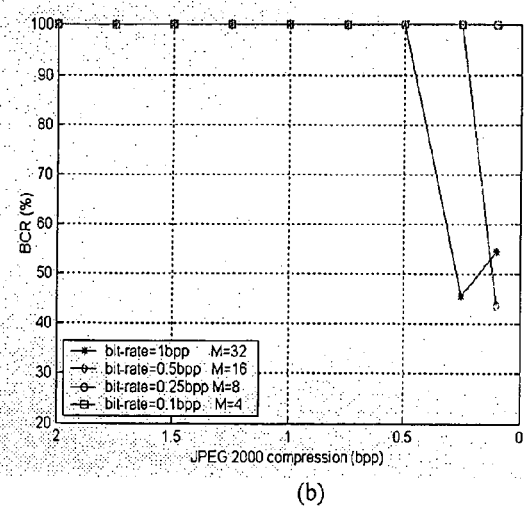
(b)
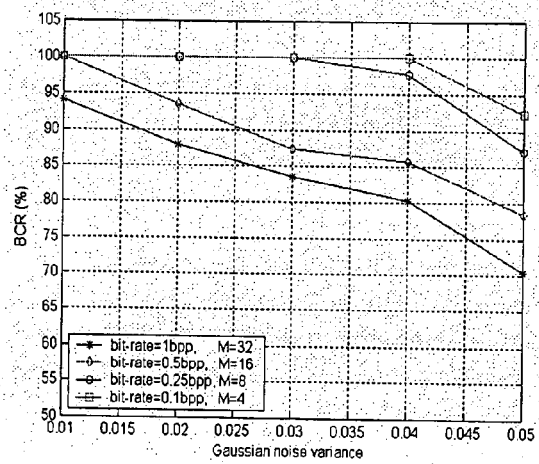
(c)
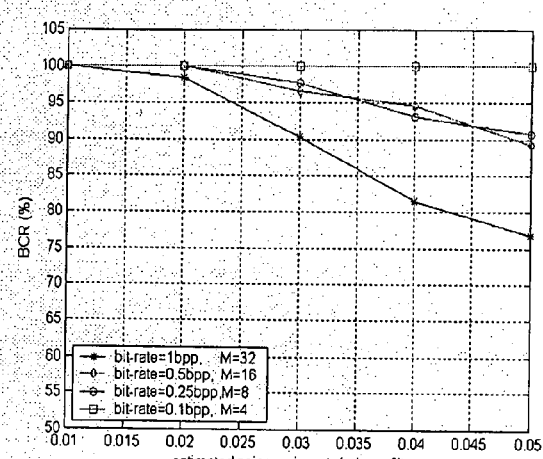
(d)
FIG. 40
FIG. 41

WATERMARK EMBEDDING AND DETECTING METHODS, SYSTEMS, DEVICES AND COMPONENTS

CROSS REFERENCE TO RELATED APPLICATION

This application claims the benefit of US Provisional Patent Application, Ser. No. 60/598,832 which was filed on Aug. 5, 2004 and is in the name of the same inventors which is entitled WATERMARK EMBEDDING AND DETECTING METHODS, SYSTEMS, DEVICES AND COMPONETS.

FIELD OF THE INVENTION

The invention relates to digital watermarks. More particularly, it relates to methods, devices and systems for embedding and detecting such watermarks, and for determining components used in embedding and detecting such watermarks.

BACKGROUND OF THE INVENTION

In general, digital watermarking is the embedding of information within a signal in such a way as to minimize the perception of the existence of the information in the signal. It is to be understood that watermarks as that term is used herein include information that is to be hidden in a signal.

Watermarking technologies are widely used in multimedia (picture, audio, video and audiovisual works) security applications, such as, for example, multimedia copyright protection, transaction tracking, or access control. Such applications can typically tolerate the inevitable distortion caused by a watermark as human senses are not 100% accurate, and the embedded information is typically perceived as noise.

For the purposes of this patent document and its interpretation, pictures and video are each considered to be "images". It is to be understand that "images" encompasses both pictures and video, and audiovisual works includes works that have both audio and image (pictures and/or video) components. Multimedia includes pictures, audio, video and audiovisual works, alone or in combination.

Various watermarking schemes have been developed to fit design requirements of particular applications. For example, ownership protection needs an ownership-indicating watermark to survive common processing and intentional attacks (be "robust"). However, for tampering detection applications, the embedded secondary data (watermark) is used to determine whether the host media has been tampered with or not, so only fragile or semi-fragile watermarks (robust to common processing, but fragile to intentional attacks) are expected for this kind of application.

Most recently reported schemes cast watermarking into the transform domain (see for example J. Cox, J. Kilian, T. Leighton, and T. G. Shamoon, "Secure Spread Spectrum Watermarking for Multimedia," in *Proceedings of the IEEE International Conference on Image Processing, ICIP'97*, Vol. 6, pp. 1673-1687, October 1997, or I. J. Cox, M. L. Miller and J. A. Bloom, Digital Watermarking, Morgan Kaufmann, 2001), due to the fact that transform domain watermarking schemes tend to achieve both perceptual transparency and robustness better than spatial/time domain schemes.

Again, a transform can be applied to all or a portion (subset) of a digitized work. As an example, a multimedia signal for watermark embedding may comprise a transform of the grey level of a digitized image. The watermark information is embedded in the signal subset. The watermark information is embedded in that signal. As will be evident to those skilled in the art, a transformed signal may be created from many different aspects of a work.

It is to be understood that a signal is not limited to representations of multimedia works, but could simply be another form of data carrying signal, or even a noise signal; provided that the signal can accept some distortion for its intended purpose.

Notwithstanding that a signal may originate from an analog or digital signal and that a watermarked signal may become a digital or an analog signal, watermarks are embedded in signal points (digitized elements) of a signal. Signal subsets may be processed as separate signals, or the subsets may form part of a signal encompassing a superset of subsets or an entire original signal. In the former case, it is to be recognized that a signal subset can itself be a signal. In the latter case, a watermark may be embedded in the signal subset without separation from the signal by processing at the time of embedding.

In terms of different robustness requirements, watermarking schemes can be divided into robust watermark, fragile watermark and semi-fragile watermark. In a robust watermark system, the embedded data can survive common signal processing operation, whereas fragile watermark becomes undetectable after even minor modification. Semi-fragile watermark is a hybrid of the above, only distortions exceeding a user-specified threshold will break the watermark.

Based on the employed embedding mechanism, existing watermarking schemes can be classified into two categories. In blind embedding algorithms, the embedded data have no relation to the host data. Additive spread spectrum algorithm (see for example J. Cox, J. Kilian, T. Leighton, and T. G. Shamoon, cited above), is a representative of this category. In the second category, data hiding is achieved by enforcing a relationship between the bits to be embedded and the marked values. Quantization based watermarking schemes are in this category. Quantization based watermarking algorithms embed the watermark, which is often a binary sequence, into the host data by quantizing the host signal with watermark associated quantizers.

The look-up table (LUT) base watermarking method is a type of quantization based watermarking. A LUT is a set of quantized values. For binary watermarking, each quantized value in a LUT carries either side information "1" or "0". A general LUT watermark embedding method maps the original data to the closest quantized value associated with the desired watermark information bit in a look-up table. The embedded watermark can then be extracted from the received image by looking at the LUT.

The odd-even embedding is a simplest case of LUT embedding, the table entries for embedding "1" and "0" are arranged in an interleaving order, which is also formulated as run of 1 LUT embedding (see for example Wu, *Multimedia Data Hiding*, Ph.D. thesis, Princeton University, 2000). "Run" means the largest number of the consecutive 0's or 1's. The larger the run, the better the robustness.

In the design of any robust watermarking scheme, robustness against data distortion through signal processing or intentional attacks and the similarity between the signal before and after watermarking are two major requirements. For some watermarking applications, watermarks designed to survive normal processing and to resist any attempt by an adversary to thwart their intended purpose. In designing a robust watermark, it is important to identify the specific processes that are likely to occur between embedding and detection. Examples of processes a watermark might need to survive include but are not limited to lossy compression, digital-to-analog-to-digital conversion, analog recording, printing and scanning, format conversion, and so on. For example, a video watermark designed for monitoring television advertisements needs to survive the various processes involved in broadcasting—digital-to-analog conversion, lossy compression, etc—but does not need to survive other processes, such as rotation or halftoning (see, for example, I. J. Cox, M. L. Miller and J. A. Bloom cited above).

For other watermarking applications, fidelity is the primary measure of concern. In these cases, the watermarked work must be indistinguishable from the original. For example, distortion-free data embedding is often required in a medical image watermarking system.

Clearly, various robustness and fidelity requirements are involved in watermarking scheme design. In applications where surviving a common signal processing operation is the primary concern, the robustness requirement should be satisfied first, then the fidelity is maximized as much as possible. In other applications, the prerequisite is the perceptual similarity between the unwatermarked and watermarked signal, the robustness needs to be maximized as much as possible.

Several methods and models have been proposed to theoretically analyze information hiding. Chen and Wornell introduced quantization index modulation (QIM) and theoretically proved that QIM achieves better robustness-distortion tradeoff than the current popular spread-spectrum methods (see B. Chen and G. W. Wornell, "Quantization Index Modulation: A Class of Provably Good Methods for Digital Watermarking and Information Embedding", *IEEE Trans. Inform. Theory*, Vol. 47, pp. 1423-1443, May, 2001, and B. Chen and G. W. Wornell, "An Information-theoretic Approach to the Design of Robust Digital Watermarking Systems", in *Proc. Int. Conf. Acoust., Speech, Signal Processing, ICASSP'99*, Vol. 4, pp. 2061-2064.). Wu indicated that through a look-up table of nontrivial run, the probability of detection error can be considerably smaller than the traditional odd-even embedding (see M. Wu, "Joint Security and Robustness Enhancement for Quantization Based Data Embedding," IEEE Trans. on Circuits and Systems for Video Tech, Vol. 13, pp. 831-841, August 2003). Optimal nonuniform quantization embedding has also been studied by Wu et.al. (see G. Wu, E.-H. Yang, and W. Sun, "Optimization strategies for quantization watermarking with application to image authentication," *Proc. Int. Conf. Acoust., Speech, Signal Processing*, pp. 672-675, 2003). Information theoretic models for data hiding have been presented by Moulin et al and are used to determined data hiding capacity (see P. Moulin and J. A. O'Sullivan, "Information-theoretic analysis of information hiding," *Proc. Int. Conf. Acoust., Speech, Signal Processing*, vol. 6, pp. 3630-3633, June 2000, and P. Moulin and M. K. Mihcak, "A framework for evaluating the data-hiding capacity of image sources," *IEEE Trans. on Image Processing*, vol. 11, no. 9, pp. 1029-1042, September 2002).

Alternative watermark embedding and detecting methods and devices are desirable.

SUMMARY OF THE INVENTION

In a first aspect the invention provides a method of determining a lookup table ("LUT") with a plurality of values for use in association with a quantizer having a plurality of quantization cells to be used for embedding a watermark in a signal having varying values. The method includes, for each quantization cell, calculating a plurality of probabilities that a signal point to be embedded with a watermark value falls into the quantized cell, each probability being calculated for a different watermark value. It includes selecting a quantization cell based on the calculated probabilities. It also includes setting the LUT value of the selected quantization cell to the watermark value with the largest calculated probability for the selected quantization cell, subject to any run constraint, where run constraint is the largest number of consecutive identical watermark values in the table. It further includes, for the remaining quantization cells, repeating the selecting and setting steps and this step.

Selecting a quantizer based on the determined first probabilities may include selecting the quantization cell with the largest probability.

The watermark values may be binary values, with the plurality of probabilities being a first probability and second probability for each quantization cell. The first probability is associated with a first watermark binary value and the second probability is associated with a second watermark binary value. Selecting a quantization cell based on the calculated probabilities may include, for each quantization cell, calculating a magnitude difference in probability between the first probability and the second probability, and selecting the quantization cell with the largest magnitude difference in probability.

The signal may be a multimedia work. The signal may be an image. The signal may be an audio work. The signal may be an audiovisual work. The signal may be a mathematical transform of a previous signal. The transform may be a discrete cosine transform. The mathematical transform may be a wavelet transform. The signal points may be wavelet coefficients.

The signal points may be a subset of the signal. The subset signal points may include a component of the signal. The signal points may be a subset of the signal, and the subset signal points may include significant wavelet coefficients of the signal.

For a known signal and a known watermark, calculating a probability may include calculating a frequency with which each signal point in the signal associated with a watermark value falls within a quantization cell.

Calculating a probability may include statistical methods for calculating the probability.

Selecting a quantization cell based upon the calculated probabilities may include selecting a quantization cell based upon the calculated frequencies. The watermark values may be binary values, with the plurality of frequencies being a first frequency and a second frequency for each quantization cell. The first frequency is associated with a first watermark binary value and the second frequency is associated with a second watermark binary value. Selecting a quantization cell based on the calculated frequencies may include, for each quantization cell, calculating a magnitude difference in frequency between the first frequency and the second frequency, and selecting the quantization cell with the largest magnitude difference in frequency.

The quantizer may be uniform. The quantizer may be non-uniform.

Prior to calculating the plurality of probabilities, quantization levels and quantization points for the quantization cells may be determined.

In a second aspect the invention provides a method of determining a quantization ensemble of quantizers for use in quantizing a signal for watermark embedding. The method includes, for each watermark value, calculating a probability density function for signal points where the watermark value is to be embedded. Based on the calculated probability density functions, a distortion function and a robustness function for an ensemble of quantizers are formulated. A given robustness or a given distortion for the distortion and robustness functions is selected. If a given robustness is selected then the distortion function is minimized for the given robustness, and an ensemble of quantizers is determined with parameters that comply with the minimized distortion function, the given robustness, and the robustness function. If a given distortion is selected then the robustness function is maximized for the given distortion, and an ensemble of quantizers is determined that complies with the maximized robustness function, the given distortion, and the distortion function.

A given robustness could simply be selected with the distortion function minimized for the given robustness and the ensemble of quantizers determined. Alternatively, a given distortion could simply be selected with the robustness function maximized for the given distortion and the ensemble of quantizers determined.

Minimizing the distortion function and maximizing the robustness function may include, for each watermark value, determining an initial quantizer for the signal points to be embedded with the watermark value. A lagrangian function J for the initial quantizers is formulated, where if a given robustness is selected then $J=D-\lambda R$, and where if a given robustness is selected then $J=-R+\lambda D$. R is the robustness function, D is the distortion function and $\lambda$ is a constant to be determined. Function J is minimized. Determining an ensemble of quantizers that complies with the maximized robustness function, the given distortion, and the distortion function may include determining an ensemble of quantizers that complies with the minimized J function.

Determining an initial set of quantizers may include determining a set of minimum mean square error ("MMSE") quantizers for signal points to be embedded with watermark values. The distortion function D may be determined as the average distortion of the ensemble of quantizers. The distortion function D may be:

$$D^{(v)} = \sum_{m=1}^{M-1} D_m^{(v)} = \sum_{m=1}^{M-1} \sum_{k=1}^{K} \int_{d_{k-1}}^{d_k} |s_m - r_{m,k}|^v f_m(s_m) ds_m,$$

where M is the number of watermark values and $f_m$ is probability density function of signal points in signal s to be embedded with a specific watermark value m.

The robustness function may be determined as the overall mean squared distance between adjacent quantizers. The robustness function may be $$R = \sum_{k=1}^{K} \left[ \sum_{i=0}^{M-1} \sum_{j=0, j \neq i}^{M-1} |r_{i,k} - r_{j,k}|^2 P_{i,k} \right]$$

where $r_{i,k}$ is a k-th reconstruction points of a quantizer for an i-th watermark value, $P_{i,k}$ is a probability that a signal (i.e., $s_i$) with signal points to be embedded with the i-th watermark value, falls into a k-th quantization cell of an i-th quantizer $Q_i$ expressed as $$P_{i,k} = \int_{d_{i,k-1}}^{d_{i,k}} f_i(s_i) ds_i, i = 0, \ldots, M-1,$$

where $f_i$ is a probability density function of the signal having signal points to be embedded with the i-th watermark value.

The watermark values may be binary, with the distortion function formulated as a function of the adjustment of an initial MMSE quantizer ensemble, $$D = D_{0,min} + \sum_{k=1}^{K} P_{0,k} \tau_{0,k} + D_{1,min} + \sum_{k=1}^{K} P_{1,k} \tau_{1,k}.$$

$D_{0,min}$ is a minimum distortion function of the initial quantization ensemble corresponding to a first binary watermark bit, $D_{1,min}$ is a distortion function of the initial quantization ensemble corresponding to a second binary watermark bit, K is the number of quantization levels, $P_{0,k}$ is a probability that a signal containing signal points to be embedded with the first binary watermark value falls into a k-th quantization cell, $P_{1,k}$ is a probability that a signal containing signal points to be embedded with the second binary watermark value falls into the k-th quantization cell, $\tau_{0,k}$ and $\tau_{1,k}$ are differences between new reconstruction points and initial reconstruction points of two quantizers for the first and second binary watermark bits, respectively, and represent an adjustment of the initial quantization ensemble to the determined quantization ensemble.

The watermark values may be binary, with the robustness function formulated as a function of the adjustment of the initial quantization ensemble, $$R = \sum_{k=1}^{K} [P_{0,k} (\tau_{0,k} + \rho_k + \tau_{1,k})^2] - \sum_{k=1}^{K} [P_{1,k} (\tau_{0,k} + \rho_k + \tau_{1,k})^2]$$

where $P_{0,k}$ is a probability that a signal containing signal points to be embedded with the first binary watermark value falls into a k-th quantization cell, $P_{1,k}$ is a probability that a signal containing signal points to be embedded with the second binary watermark value falls into the k-th quantization cell, $\tau_{0,k}$ and $\tau_{1,k}$ are differences between new reconstruction points and initial reconstruction points of two quantizers for the first and second binary watermark bits, respectively, and represent an adjustment of the initial quantization ensemble to the determined quantization ensemble, and $\rho_k$ is an initial distance between the k-th reconstruction points of the initial and determined quantization ensembles for the first and second binary watermark values.

The initial quantization ensemble may be initialized as a set of minimum mean-square-error quantizers ("MMSE") according to:

$$d_k = \frac{r_k + r_{k+1}}{2}, k = 0, \ldots, K$$

$$r_k = \frac{\int_{d_{k-1}}^{d_k} s f_s(s) ds}{\int_{d_{k-1}}^{d_k} f_s(s) ds}, k = 1, \ldots, K$$

where s is the source signal on which the MMSE quantizers are to be determined, $f_s(s)$ is the probability density function of s, $d_{k-1}$, $d_k$ and $r_k$ are decision levels and reconstruction points, k identifies a quantization cell, and K is the total of the quantization cells.

The minimum distortion measure of the initial quantization ensemble may be determined according to:

$$D_0 = \sum_{k=1}^{K} \left[ \int_{d_{k-1}}^{d_k} |s - r_k|^2 f_s(s) ds \right]$$

where s is the source signal on which the MMSE quantizers are to be determined, $f_s(s)$ is the probability density function of s, $d_{k-1}$, $d_k$ and $r_k$ are decision levels and reconstruction points, k identifies a quantization cell, and K is the total of the quantization cells.

In a third aspect the invention provides a method of quantizing a signal for watermark embedding in association with lossy compression of the signal. The method includes determining the strength of the lossy compression, and adapting the strength of the watermark in relationship with the strength of the compression by selecting a quantization ensemble for watermark embedding in accordance with a mapping. The mapping defines an association between quantization ensembles and compression strengths, and the mapping associates a plurality of quantization ensembles, each quantization ensemble for a different range of compression strengths, such quantization ensembles having acceptable distortion for that quantization ensembles range of compression strengths. Distortion causing characteristics and robustness increase from quantization ensemble to quantization ensemble in the mapping as associated compression strengths increase.

Each quantization ensemble in the mapping may be determined using the earlier robustness maximization method and the acceptable distortion as the given distortion. Each quantization ensemble in the mapping may be a uniform quantizer whose quantization interval is selected to increase robustness of the watermark for a given distortion from quantization ensemble to quantization ensemble as compression strength increases.

The quantization interval for signal points that are wavelet coefficients may increase from quantization ensemble to quantization ensemble as compression strength increases, and the lossy compression may be performed in accordance with JPEG2000 compression standard.

The mapping may be:

| bit-rate φ | estimated interval Q |
| --- | --- |
| >1 | 2 |
| 1~0.8 | 4 |
| 0.8~0.5 | 8 |
| 0.5~0.25 | 16 |
| 0.25~0.2 | 32 |
| 0.2~0.1 | 48 |
| <0.1 | 64 | where increasing bit-rate φ is an indication of increasing compression strength, and where estimated interval Q is the quantization interval of a quantization ensemble.

In a fourth aspect the invention provides a method of embedding a watermark in a signal. The method includes determining a prior probability $p_s$ that a signal point of the signal has a first range magnitude, a prior probability $p_1$ that a signal point of the signal has a second range magnitude, a variance $\sigma_s^2$ of the first range magnitude portion of the signal, a variance $\sigma_1^2$ of the second range magnitude portion of the signal according to a prior parametric statistical model and maximum likelihood criteria. A probability is calculated that a signal point has a second range magnitude according to the statistical model and the determined probabilities and variances. Those signal points in the signal that have a large calculated probability of having a second range magnitude are selected for watermark embedding by comparing the probability to a preset threshold.

The first range magnitude may be a small magnitude, and the second range magnitude may be a large magnitude. The prior parametric statistical model may be a Gaussian Mixture model.

The parameters of the model including the prior probabilities and variances may be determined by using an Expectation-Maximization algorithm. The preset threshold may be determined based upon the number of the signal points that are needed to embed the watermark. The preset threshold may be selected such that the number of signal points having larger calculated probability of having a large magnitude is equal to the number of signal points required to embed the watermark.

The signal may be a mathematical transform of a previous signal. The transform may be a discrete cosine transform. The mathematical transform may be a wavelet transform. The signal points may be wavelet coefficients.

The signal points may be a subset of the signal. The subset signal points may include a component of the signal. The signal points may be a subset of the signal, and the subset signal points may include significant wavelet coefficients of the signal.

Other aspects of the invention include processors, computer programs, and systems implementing the above methods, embedding and quantizing methods utilizing the above methods or their results, and other methods that will be evident based on the description and figures provided herein.

BRIEF DESCRIPTION OF THE DRAWINGS

For a better understanding of the present invention and to show more were clearly how it may be carried into effect, reference will now be made, by way of example, to the accompanying drawings that show the preferred embodiment of the present invention and in which:

FIG. 27 is a block diagram of watermark embedding as part of JPEG 2000 image compression in accordance with a preferred embodiment of the present invention, FIG. 28 is a schematic representation of a JPEG 2000 watermark embedding method in accordance with a preferred embodiment of the invention, FIG. 29 is a graph illustrating a quantization table used for JPEG 2000 watermark embedding, FIG. 30 is a JPEG 2000 compressed image with bit-rate=1 bpp, FIG. 31 is a watermarked image of FIG. 30, FIG. 32 is a JPEG 2000 compressed image with bit-rate=0.5 bpp, FIG. 33 is a watermarked image of FIG. 32, FIG. 34 is a JPEG 2000 compressed image with bit-rate=0.25 bpp, FIG. 35 is a watermarked image of FIG. 34, FIG. 36 is a JPEG 2000 compressed image with bit-rate=0.1 bpp, FIG. 37 is a watermarked image of FIG. 36, FIG. 38 is a graph of the robustness of watermarked images generated using four different bit-rates against JPEG baseline compression, FIG. 39 is a graph of the robustness of watermarked images generated using four different bit-rates against JPEG 2000 compression, FIG. 40 is a graph of the robustness of watermarked images generated using four different bit-rates against additive noise, FIG. 41 is a graph of the robustness of watermarked images generated using four different bit-rates against noise-removal filtering.

DETAILED DESCRIPTION OF THE PREFERRED EMBODIMENT

For ease of understanding, the methods and devices described herein are described with reference to still images (pictures). It is to be understood that the methods and devices may be applied to other media, including for example other forms of multimedia works, such as audio, video, and audiovisual works. Some modification may be desirable to optimize the benefits obtained in using the methods described herein when moving between different types of signals. For example, when working with still images (pictures) a Gaussian Mixture Model is used herein to identify significant coefficients for watermark embedding. This model may not ideally describe other multimedia signals, such as audio. If this is the case then another statistical model may be used. It is to be understood that the methods and devices described herein when applied to signals other than still images (pictures) fall within one or more embodiments of the invention.

1. Near-Minimum Distortion LUT Embedding

Look-up table (LUT) embedding is a simple embedding technique used to hide information into multimedia work for copyright protection, transaction tracking or content annotation. The used look-up table is often associated with a cryptographic key, thus providing security to embedding. In one aspect, the methods described herein utilize an LUT that is selected according to the distribution of the host data and the watermark data to be embedded. This can greatly reduce the distortion from LUT embedding. Methods of selecting the look-up table will also be described. It has been found that security and robustness of the watermarking system can be acceptably maintained.

In order to understand the application of the methods, the general operation of LUT embedding systems will now be described.

Figure 1:
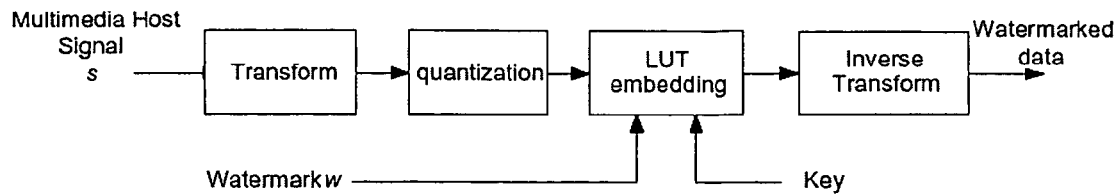
FIG. 1 is a schematic diagram of a method of LUT watermark embedding in accordance with a preferred embodiment of the present invention.

Referring to FIG. 1, a LUT or "key" is a random sequence of 0's and 1's, with runs of 0's and 1's being limited in length. It also constitutes the key for the watermark extraction algorithm. First, every possible value of the host data is quantized to a small set of values using a quantization function (Q(.)). The quantization values are equal in number to the size of the LUT. For example, a uniform quantizer with cell width q maps the original signal to kq, k=1, ..., K, where K is the size of the LUT.

Second, the LUT is used to embed the quantized value with a "0" or "1". To embed a "1" in a coefficient, the coefficient is unchanged if the entry of the table corresponding to that coefficient is also a "1". If the entry of the table is "0" then the coefficient is changed to its nearest neighboring value for which the entry is "1". The embedding of a "0" is similar. The look-up function (Lookup(.)) simply returns a "0" or "1" depending upon the input index, Lookup(x)=value in Look-up table at index x    (1)

The LUT(.) function takes the value of the original signal as the input and maps it to a "0" or "1" depending upon the LUT. Thus, the LUT(.) function is actually a simple composition of the lookup and the quantization functions:

LUT(x)=Lookup(Q(x))    (2)

An orthogonal transformation T(.) decomposes the host data s into coefficients x in the watermark domain to which the watermark w is embedded. Then the coefficients are quantized and mapped according to LUT.

The entire process of altering a coefficient can be abstracted into the following formula where s is the original coefficient, x is the marked one, b is the bit to be embedded, LUT(.) is the mapping by the Look-up Table:

$$x = \begin{cases} s & \text{if } LUT(s) = b \\ s+d & \text{if } LUT(s) \neq b \text{ where } d = \min_{|d|} LUT(s+d) = b \end{cases} \quad (3)$$

For LUT embedding, once the LUT is known to the detector, the watermark can be extracted easily through a simple lookup from the LUT. The table is looked up as $$\hat{b} = LUT(\hat{x}) \quad (4)$$

where $\hat{b}$ is the extracted bit and $\hat{x}$ is the watermarked, possibly corrupted signal.

Figure 2:
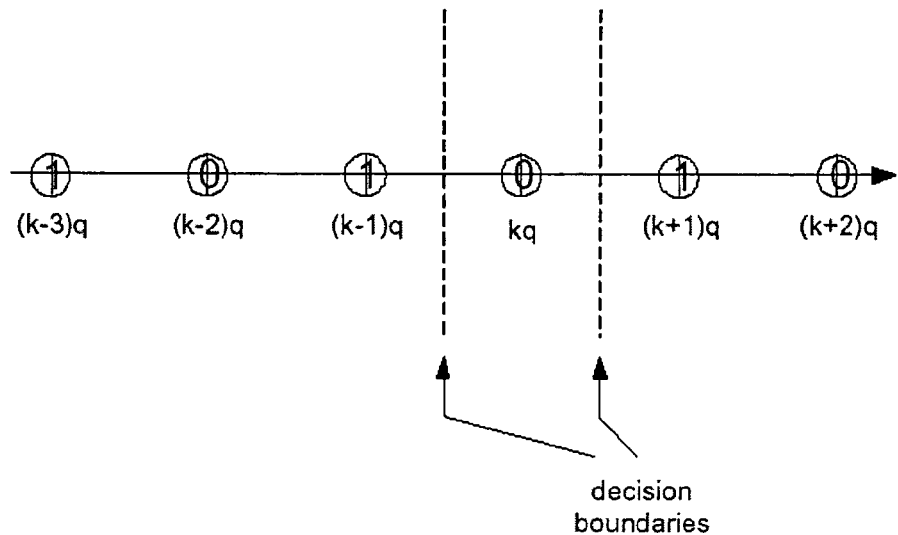
FIG. 2 is a schematic illustration of uniform quantization utilized in a preferred embodiment of LUT embedding in accordance with a preferred embodiment of the present invention.

Referring to FIG. 2, a typical LUT embedding algorithm is odd-even embedding. In FIG. 2, the LUT is 101010. First, a uniform quantization function Q(.) is defined which partitions the signal space $\Re$ into subsets. The host data is mapped to the nearest even number quantization point to embed a "0" and the nearest odd number quantization point to embed a "1". Thus a rather global relationship between the watermark bit and the marked signal is deterministically enforced.

The watermark bit is extracted by the following way $$\hat{b} = \begin{cases} 0 & \text{if } Q(\hat{x})/q \text{ is even} \\ 1 & \text{if } Q(\hat{x})/q \text{ is odd} \end{cases} \quad (5)$$

In the odd-even embedding scheme, the table entries for embedding "1" and "0" are arranged in an interleaving order, { . . . , Lookup((k−1)q)=0, Lookup(kq)=1, Lookup((k+1)q)=1, Lookup((k+2)q)=1, . . . }, which is also formulated as run=1 LUT embedding in M. Wu, "Joint security and robustness enhancement for quantization based data embedding," *IEEE Trans. on Circuits and Systems for Video Tech*, vol. 13, no. 8, pp. 831-841, August 2003. It is pointed out that LUT embedding with larger run constraints introduces larger distortion but has smaller probability of detection error. During the process of LUT embedding, when Lookup(Q(x)) does not match the bit to be embedded, b, a nearby entry in LUT that is mapped to b must be found. As such, the run of "1" and "0" entries of an LUT becomes a main concern which needs to be constrained to avoid excessive modification on the feature.

Distortion in LUT embedding can be analysed as follows. In LUT embedding, uniform quantization Q(.) divides the input signal space into K levels of equal spacing. Then if the k-th entry of LUT is b, the data samples of signal s in the quantization cell of [(k−1/2)q, (k+1/2)q] which to be embedded b is rounded to kq, the mean square distortion produced by this operation is calculated as $$D_{kq}(s) = \int_{(k-1/2)q}^{(k+1/2)q} |s - kq|^2 f(s) ds \quad (6)$$

where f(s) is the Probability Density Function of s. However, if the desired bit for s is not b, the host data must be mapped to the nearest quantization points corresponding to the desired bit (k±1)q, 1>0. If the maximum allowable run is 2, the entry next to the k-th entry, i.e. either the k−1th entry or k+1th entry or both matches the desired bit. The above situation can be subdivided into 3 cases:

Case 1: {Lookup((k−1)q)=Lookup(kq)=b and Lookup(kq)≠{Lookup((k+1)q)};

Case 2: {Lookup((k−1)q)≠Lookup(kq) and Lookup(kq)={Lookup((k+1)q)}=b};

Case 3: {Lookup((k−1)q)≠Lookup(kq)=b and Lookup(kq)=b≠Lookup((k+1)q)}.

In all the cases, further distortion will be introduced. If it is the first case, the samples of s which are in the quantization cell of [(k−1/2)q, (k+1/2)q] have to be rounded to (k+1)q. The distortion is $$D_{Case1}(s) = \int_{(k-1/2)q}^{(k+1/2)q} |s - (k+1)q|^2 f(s) ds \quad (7)$$

$$= D_{kq} + q^2 \int_{(k-1/2)q}^{(k+1/2)q} f(s) ds -$$

$$2q \int_{(k-1/2)q}^{(k+1/2)q} (s - kq) f(s) ds$$

Similarly, in the second case, the samples in k-th cell have to be mapped to (k−1)q. This provides:

$$D_{Case2}(s) = D_{kq} + q^2 \int_{(k-1/2)q}^{(k+1/2)q} f(s) ds + 2q \int_{(k-1/2)q}^{(k+1/2)q} (s - kq) f(s) ds \quad (8)$$

In the third case, two nearest quantization points (k+1)q and (k−1)q correspond to the desired bit simultaneously, then the original features in the range of [(k−1/2)q, kq] will be rounded to (k−1)q, and the features in the other half interval [kq, (k+1/2)q] will be mapped to (k+1)q. The distortion will be composed by two parts:

$$D_{Case3}(s) = \int_{(k-1/2)q}^{kq} [s - (k-1)q]^2 f(s) ds + \quad (9)$$

$$\int_{kq}^{(k+1/2)q} [s - (k+1)q]^2 f(s) ds$$

$$= D_{kq} + q^2 \int_{(k-1/2)q}^{(k+1/2)q} f(s) ds +$$

$$2q \left[ \int_{(k-1/2)q}^{kq} (s - kq) f(s) ds - \int_{kq}^{(k+1/2)q} (s - kq) f(s) ds \right]$$

If the feature is approximately uniformly distributed within each cell or only a fine quantizer is utilized, the last terms of (7) and (8) are close to 0, and the last term of (9), which is in the range of $[-q^2 \int_{(k-1/2)q}^{(k+1/2)q} f(s)ds, 0]$, and approximates $$-\frac{q^2}{2} \int_{(k-1/2)q}^{(k+1/2)q} f(s)ds.$$

For a binary data hiding system, the features can be divided into two categories: the features that are used to embed bit "0", denoted by $s_0$, and the features that are used to embed bit "1", denoted by $s_1$. The probability density functions (PDF) of $s_0$ and $s_1$ are $f_0(s_0)$ and $f_1(s_1)$, respectively.

First, consider the overall mean squared distortion due to quantization only, $$MSE_{quan} = \sum_{k=1}^{K} \left[ \int_{(k-1/2)q}^{(k+1/2)q} |s_0 - kq|^2 f_0(s_0) ds_0 + \int_{(k-1/2)q}^{(k+1/2)q} |s_1 - kq|^2 f_1(s_1) ds_1 \right] \qquad (10)$$

$$= \sum_{k=1}^{K} [D_{kq}(s_0) + D_{kq}(s_1)]$$

Now consider that each of the K LUT entries is either "0" or "1". In all K quantization cells, either the data to be embedded "0" or the data to be embedded "1" are mapped to their local reconstruction points.

Other data have to be mapped to neighboring reconstruction points where the above three cases appear. According to (7)-(9), the overall LUT embedding distortion can be formulated as $$MSE_w = MSE_{quan} + q^2 \sum_{k=1}^{K} \alpha_{0,k} \int_{(k-1/2)q}^{(k+1/2)q} f_0(s_0) ds_0 + \qquad (11)$$

$$q^2 \sum_{k=1}^{K} \alpha_{1,k} \int_{(k-1/2)q}^{(k+1/2)q} f_1(s_1) ds_1 -$$

$$\frac{q^2}{2} \sum_{k=1}^{K} \beta_{0,k} \int_{(k-1/2)q}^{(k+1/2)q} f_0(s_0) ds_0 - \frac{q^2}{2} \sum_{k=1}^{K} \beta_{1,k} \int_{(k-1/2)q}^{(k+1/2)q} f_1(s_1) ds_1$$

where α and β can be 0 or 1, α(0,k)=1 if the k-th reconstruction point is for "1" embedding, similarly α(1,k)=1 when the k-th LUT entry is "0", hence α(0,k)=mod(α(1,k)+1,2), only when Case 3 appears, β is 1, that is: if {Lookup((k−1)q)≠Lookup(kq), Lookup(kq) ≠{Lookup((k+1)q), Lookup(kq)=1}, β$_{0,k}$=1}; or {Lookup((k−1)q)≠Lookup(kq), Lookup(kq)≠{Lookup((k+1)q)}, Lookup(kq)=0}, β$_{1,k}$=1}, $\int_{(k-1/2)q}^{(k+1/2)q} f_0(s_0)ds_0$ and $\int_{(k-1/2)q}^{(k+1/2)q} f_1(s_1)ds_1$ represent the probability that $s_0$ and $s_1$ fall into the k-th quantization cell of Q(.) respectively. They can be denoted as as $P_{0,k}$ and $P_{1,k}$, i.e.:

$$P_{0,k} = \int_{(k-1/2)q}^{(k+1/2)q} f_0(s_0) ds_0 P_{1,k} \qquad (12)$$

$$= \int_{(k-1/2)q}^{(k+1/2)q} f_1(s_1) ds_1$$

Thus, (11) can be rewritten as:

$$MSE_w = MSE_{quan} + q^2 \sum_{k=1}^{K} \alpha_{0,k} P_{0,k} + \qquad (13)$$

$$q^2 \sum_{k=1}^{K} \alpha_{1,k} P_{1,k} - \frac{q^2}{2} \sum_{k=1}^{K} \beta_{0,k} P_{0,k} - \frac{q^2}{2} \sum_{k=1}^{K} \beta_{1,k} P_{1,k}$$

If the original feature follows uniform distribution, the probabilities that the feature falls into each quantization cell will be exactly the same, then various LUTs have the same overall distortion.

Here, it is assumed that the distribution of the host signal is nonuniform. It is reasonable, as in real world most signals are not uniform. For example, the wavelet coefficients of a natural image do not follow uniform distortion. The probabilities that a nonuniform signal falls in each quantization cell are different to each other. Embedding watermark according to different LUT scheme can produce different distortion. From (13), it can be seen that the parameters $\alpha_{0,k}$, $\alpha_{1,k}$, $\beta_{0,k}$ and $\beta_{1,k}$, k=1, . . . , K corresponding to each LUT scheme is unique. Therefore, various distortion can be obtained with various LUT schemes. Among them, the LUT which achieves near minimum distortion is our target.

Figure 3:
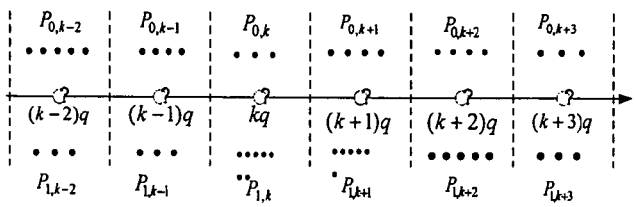
FIG. 3 is an example of wavelet coefficients to be embedded with a watermark.

Referring to FIG. 3, an example of wavelet coefficients to be embedded with a watermark is shown. The number of coefficients to be embedded either "0" or "1" that fall into each quantization cell is different from one cell to the next, as represented by the number of dots. A variety of run of 2 LUTs can be used (as represented by the question marks, "?"); for the purpose of this aspect of the preferred embodiment an LUT is sought that will minimize distortion.

According to (13), the LUT embedding distortion is determined by the LUT (α and β) and the distribution of $s_0$, $s_1$. The near-minimum distortion look-up table is obtained by looking at the probabilities that the coefficients to be embedded "0" or "1" fall into each cell, $P_{0,k}$ and $P_{1,k}$ k=1,2...K. Because of the maximum allowable run of 2, for the kth cell, either the coefficients to be embedded "0" or the coefficients to be embedded "1" are mapped to kq, others are mapped as far as the neighboring quantization points (k−1)q or (k+1)q.

Different LUT strategies, i.e. which coefficients are mapped to their local quantization points, generate different distortion cost. The difference $PD_k$ between the pair of probabilities: $P_{0,k}$ and $P_{1,k}$ determines the distortion cost that is paid for LUT embedding. That is, the more $PD_k$ is, the more distortion there is if the entry is set to the bit with less probability.

Accordingly, each entry should be set to the bit corresponding to the higher probability in priority with regard to the probability difference. First take abstract value of $PD_k$ and sort it in, descending order. Then the look-up table is built in the way that the entry corresponding to the largest probability difference is set to the bit corresponding to the larger probability in priority.

For example, if $PD_k$ is the largest in the queue currently and the look-up table entry Lookup(kq) is still not determined yet (i.e. the queue isn't finished), set Lookup(kq)=0 if $P_{0,k}>P_{1,k}$, otherwise Lookup(kq)=1. After each operation, remove the largest probability difference from the queue and move on the next. The assignment should also satisfy the present maximum run number, in this case r=2, i.e. the maximum run for "0" or "1" must be equal or less than 2.

More generally, a lookup table ("LUT") can be determined by, for each quantization cell, calculating a plurality of probabilities that a signal point to be embedded with a watermark value falls into the quantized cell, each probability being calculated for a different watermark value. A quantization cell is selected based on the calculated probabilities. The LUT value of the selected quantization cell is set to the watermark value with the largest calculated probability for the selected quantization cell, subject to any run constraint, where run constraint is the largest number of consecutive identical watermark values in the table. For the remaining quantization cells, the selecting and setting steps are repeated until the LUT values for all cells are set.

Based on the probability analysis discussed above, two particular LUT design methods set out below can be employed to achieve near-minimum mapping distortion. As discussed above, other embodiments are possible.

Figure 4:
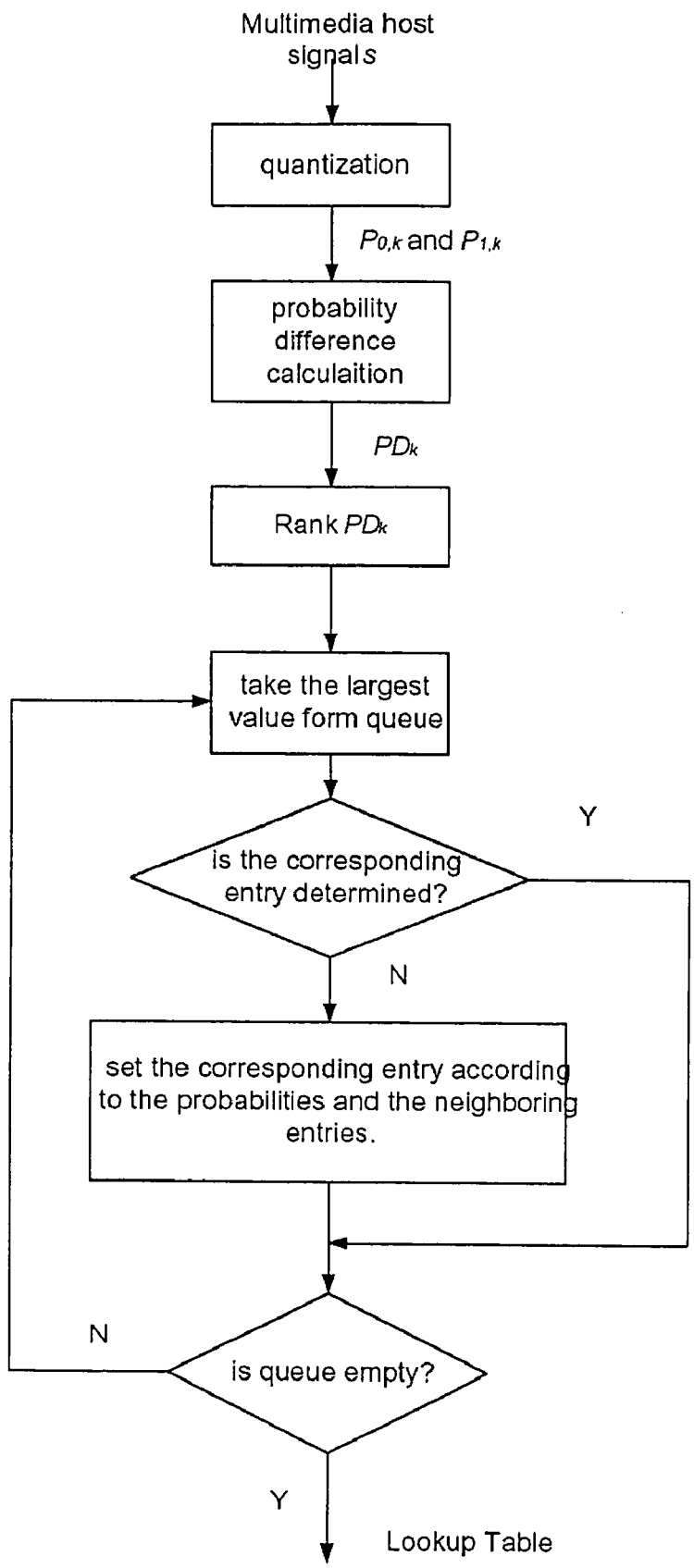
FIG. 4 is a flowchart of a method of determining a minimum distortion lookup table in accordance with a preferred embodiment of the invention.

Method 1:

Referring to FIG. 4, the steps for run of 2 can be summarized in the following four steps:

STEP 1: Calculate the difference $PD_k$ between each pair of probabilities: $P_{0,k}$ and $P_{1,k}$.

STEP 2: Rank the absolute value of $PD_k$ in descending order.

STEP 3: Find the largest absolute value of $PD_k$ from the above queue. If Lookup(kq) has been determined, go to STEP 4. Otherwise, among the determined lookup table entries, if any of the following situations occurs, Lookup((k−2)q)=Lookup((k−1)q)=l, Lookup((k−1)q)=Lookup((k+1)q)=l, Lookup((k+1)q)=Lookup((k+2)q)=l, l∈{0,1}, Lookup(kq) is set to the complement of l: Lookup(kq)=mod(l−1,2), no matter j value; otherwise Lookup(kq)=j, the original feature corresponds to $P_{j,k}$ is not shifted to other quantization points.

STEP 4: $PD_k$ is removed from the queue. If the queue is not empty, go back to STEP 3.

Figure 5:
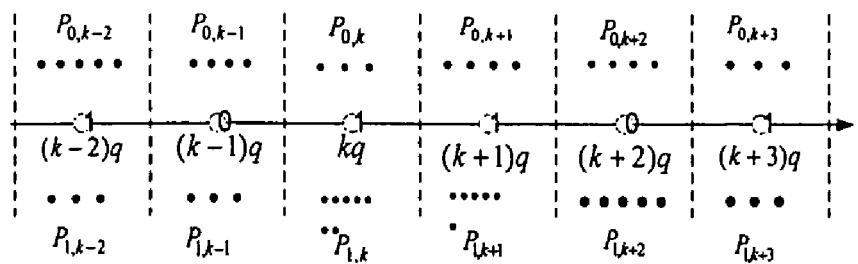
FIG. 5 is an example of a max-run=2 near minimum distortion look-up table of 101101 determine in accordance with the method of FIG. 4.

FIG. 5 shows an example of a max-run=2 near minimum distortion look-up table of 101101. In order to further improve robustness, only wavelet coefficients with large magnitude are selected to bear a watermark. In general, these coefficients do not change significantly after image processing and compression attack.

Method 2:

In an alternative embodiment, the probabilities $P_{0,k}$, $P_{1,k}$ may be used in the LUT design method rather than the difference $PD_k$. The LUT is designed such that host data points with high probabilities are quantized to their own cells and the quantization error is reduced.

The probabilities that the coefficients to be embedded "0" and "1" fall into each cell are calculated, $P_{0,k}$ and $P_{1,k}$, k=1, 2, ..., M and $\Sigma_{k=1}^{M}(P_{0,k}+P_{1,k})=1$. First, all $P_{0,k}$ and $P_{1,k}$ are sorted in a descending order to form a descending queue. Note that the probabilities can be calculated by their relative frequencies or other statistical estimation methods.

Then, the LUT is built in the way that the entry corresponding to the largest probability is set to its corresponding quantization cell in the highest priority. For example, if $P_{0,k}$ is the largest in the probability queue and the LUT bit entry T(k) is not determined, set T(k)=0. After each operation, the largest probability value is removed from the queue and the procedure moves on to the next largest one.

STEP 1: Arrange the probabilities that the original coefficients associated with the desired bits fall into each quantization cell in a descending order.

STEP 2: Find the largest probability $P_{j,k}$ from the above queue, where j=0 or 1. If T(k) has been determined, go to step 3. Otherwise, T(k) is set to the complement of j, i.e., T(k)=mod(j+1,2), if any of the following situation occurs: T(k−2)=T(k−1)=j; T(k−1)=T(k+1)=j; T(k+1)=T(k+2)=j; k=2, T(1)=j; or k=L−1, T(L)=j. If none of the above occurs, set T(k)=j, the original coefficient corresponding to $P_{j,k}$ is able to be quantized to its own cell.

STEP 3: $P_{j,k}$ is removed from the queue. If the queue is not empty, go back to step 2.

A method of selecting signal points of the signal for embedding a watermark will now be described. The method determines a prior probability $p_s$ that a signal point of the signal has a small magnitude, a prior probability $p_l$ that a signal point of the signal has a large magnitude, a variance $\sigma_s^2$ of the small magnitude portion of the signal, a variance $\sigma_l^2$ of the large magnitude portion of the signal according to a prior parametric statistical model and maximum likelihood criteria, and calculating a probability that a signal point has a large magnitude according to the statistical model and the determined probabilities and variances. The signal points in the signal that have a large calculated probability of having a large magnitude are then selected for watermark embedding by comparing the probability to a preset threshold.

Although this method will be described for use in association with the near minimum LUT method described above, it is to be understood that the selection of these signal points for watermark embedding applies also to other watermark embedding methods, such as, for example, other LUT embedding methods and non-uniform quantization watermark embedding methods.

Also, although the selection method is described with respect to the selection of significant coefficient signal points, other large magnitude signal points may be used for signals in different domains. Furthermore, two range magnitudes have been used for dividing signal points for selection; namely, small magnitude and large magnitude. The watermark is embedded in the range of large magnitude signal points. This has been found to be well adapted to embedding watermarks in images in the wavelet domain. For other applications, it may be desirable to embed only in the small magnitude. Accordingly, the method may be generalized to a first range magnitude and a second range magnitude, where the case of small magnitude and large magnitude as first range magnitude and second range magnitude, respectively, will be described further herein as an example of the general method.

The embeddable coefficients are selected based on a Gaussian Mixture Model in a wavelet subspace by Expectation-Maximization (EM) algorithm, for a general discussion of EM see Yuan and X.-P. Zhang, "Fragile watermark based on the gaussian mixture model in wavelet domain for image authentication," *Proc. Int. Conf. Image Processing*, vol. 1, pp. 505-508, 14-17, September 2003. The wavelet coefficients have a peaky, heavy-tailed marginal distribution, which record image texture and edge information at different scales, see J. Romberg, H. Choi, and R. Baraniuk, "Bayesian tree-structured image modeling using wavelet-domain hidden markov models," *IEEE Trans. on Image Processing*, vol. 10, no. 7, July 2001. There are only a few significant coefficients (those with large values) at the positions where edges occur in the image, while most others take small values. Because these coefficients correspond to the edge and singularity information, modifying these coefficients is imperceptible and robust against normal image processing.

This statistical characteristic can be expressed by using a two component Gaussian mixture:

$$p(w_i) = p_s \cdot g(w_i, 0, \sigma_s^2) + p_l \cdot g(w_i, 0, \sigma_l^2) \tag{14}$$

$$p_s + p_l = 1 \tag{15}$$

where the class of small coefficients is represented by subscript "s" and the class of large coefficients by subscript "l".

The a priori probabilities of the two classes are represented by $p_s$ and $p_l$, respectively. The Gaussian component corresponding to the small coefficients has a relatively small variance $\sigma_s^2$ capturing the peakiness around zero, while the component corresponding to the large state has a relatively large variance $\sigma_l^2$, capturing the heavy tails. An EM algorithm as in M. S. Crouse, R. D. Nowak and R. G. Baraniuk, "Wavelet-based statistical signal processing using hidden Markov models," *IEEE Transactions on Signal Processing*, pp. 886-902, Vol. 46, No. 4, April 1998, can then be applied to find out the Gaussian mixture model by obtaining the model parameters $[p_s, p_l, \sigma_s^2, \sigma_l^2]$.

The Gaussian mixture model is then used to find large coefficients for watermarking. The watermark will only be embedded into the class of large coefficients because modifying coefficients which represent the edge information will introduce less perceptual degradation.

Significant coefficients are then selected by examining the coefficient magnitude that is larger than a threshold $\rho$ determined by the obtained Gaussian mixture model. By applying the EM algorithm, the statistical parameters of the two classes of coefficients, i.e. $[p_s, p_l, \sigma_s^2, \sigma_l^2]$ can be obtained. The dividing line between the two classes: small and large magnitude can then be determined. This dividing line can be used as the threshold.

That is, suppose that there are m coefficients in a detail subband s, the number of coefficients which is larger than $\rho$ is approximately $mp_l$ and the number of coefficients less than $\rho$ is approximately $mp_s$. Coefficient $w_s(x,y)$ will be chosen for watermark embedding if $w_s(x,y) \leq \rho$.

Note that this statistical model based significant coefficient selection method can also be used in other transform domain such as discrete cosine transform (DCT) domain.

The above near minimum watermarking scheme, with and without significant coefficient selection, was tested on seven images of different types. The quality of watermarked and attacked image was evaluated using peak-signal-to-noise-ratio (PSNR), and robustness under several intentional/unintentional attacks is denoted by bit correct ratio (BCR). First, a binary watermark is inserted into the images by applying the new method.

Figure 6:
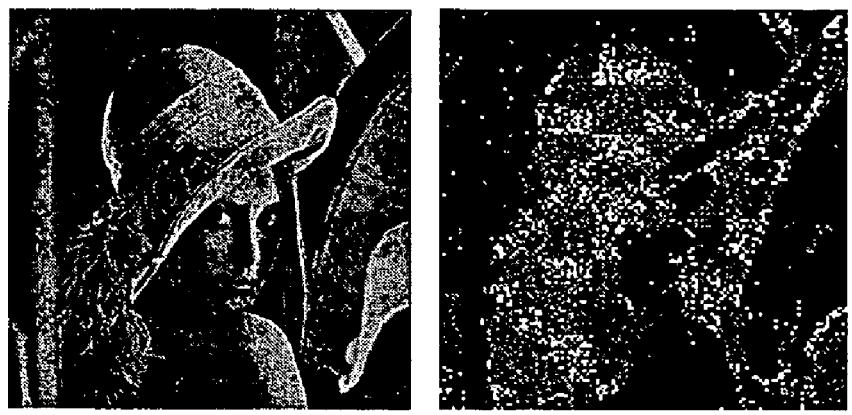
FIG. 6 is a watermarked image (left) and the difference from the original image with black denoting zero difference (right)

Referring to FIG. 6 as an example, shown are a watermarked image (left) and the difference from the original image with black denoting zero difference (right). The modified significant coefficients are mainly at edges in the image.

Figure 7:
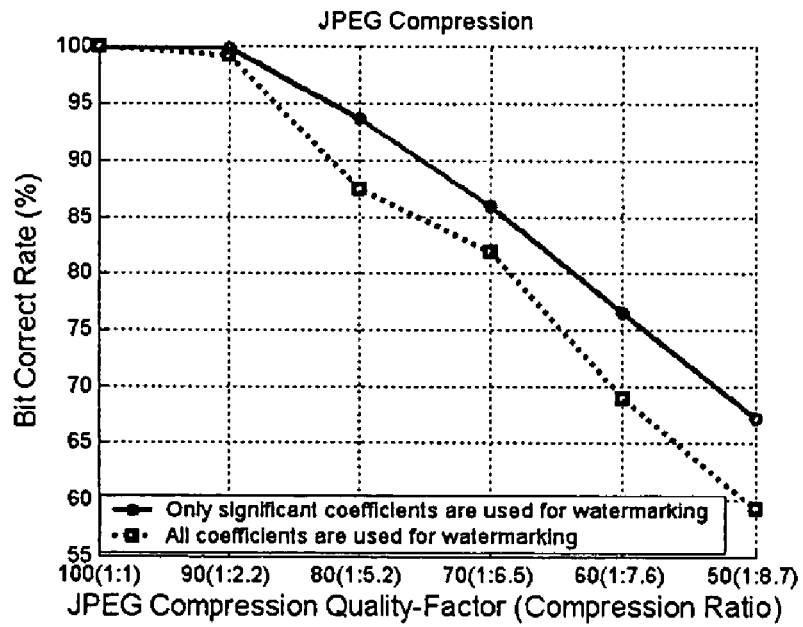
FIG. 7 is a chart illustrating the robustness of a watermark embedded using a look-up table determined using the method of FIG. 4 when significant coefficients are used for watermarking and when all coefficients are used for watermarking against JPEG2000 compression.

Referring to FIG. 7, the watermark robustness to common operations such as image compression has been tested. The discrete cosine transform (DCT) based coding system, JPEG baseline, and the discrete wavelet transform (DWT) based coding system, JPEG 2000, are the two compression attacks used in the tests. Robustness is evaluated by the average BCR for all test images. The BCR of the extracted watermark is larger than 75% until the compression quality factor is smaller than 60.

Figure 8:
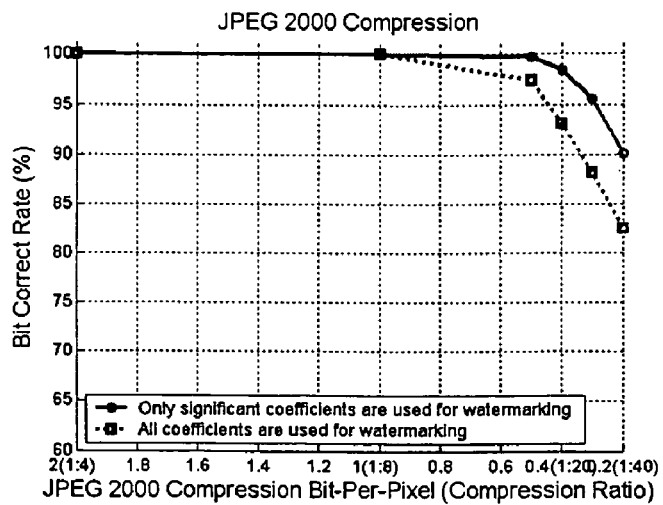
FIG. 8 is a chart illustrating robustness of a watermark embedded using a look-up table determined using the method of FIG. 4 when significant coefficients are used for watermarking and when all coefficients are used for watermarking against JPEG2000 compression.

Referring to FIG. 8, since the watermark is embedded in the wavelet domain, the presented method has perfect robustness against DWT based JPEG compression attack when the compression is relatively low. The decoded watermark can be 100% reconstructed after JPEG compression of 1 bpp and is reliable until a compression bit-rate smaller than 0.2 bpp (1:40).

Figure 9:
FIG. 9 is an example of a watermark extracted from an uncompressed image (left) and the same watermark extracted after a JPEG 2000 severely compressed (1:40) image (right)

Referring to FIG. 9, the embedded watermark (left) and the extracted watermark (right) are examples of the watermark extraction with JPEG severe compression (1:40) and shows that the methods can survive JPEG compression very well.

Referring again to FIGS. 7 and 8, a comparison of watermark embedding using a near minimum distortion LUT with and without the statistical model based significant coefficient selection is also shown. The advantages of significant coefficient selection are apparent.

Figure 10:
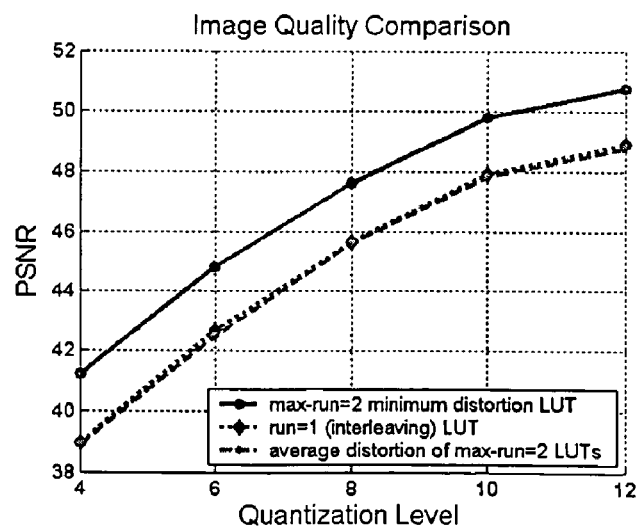
FIG. 10 is a chart illustrating an image quality comparison between run=1 (interleaving) LUT, distortion minimized run=2 LUT embedding, and the average for all maximum-run=2 LUTs.

Referring to FIG. 10, the distortion performance across various quantization levels is shown for an interleaving LUT (odd-even embedding, run=1), for a distortion-minimized LUT selected as set out above for a maximum allowable run of 2, and for average distortion of all LUTs with maximum allowable run of 2. The distortion was the lowest for the distortion-minimized LUT selected as set out above. Significant coefficient selection was used in all cases to allow an evaluation of the near minimum distortion LUT method It is to be noted that the above methods can also be used to generate more than one near-minimum-distortion look-up table. For example, the minimum distortion LUT can be determined with the above methods. The probabilities are ranked in a descending order, thus the LUT entries that have more significant effects on signals are fixed in priority and the entries that have insignificant effects are determined last. A sub-optimal LUT can be found by flipping over these insignificant entries. These entries can be flipped over one by one in an order inverse to previous determining LUT entries operation. The run of 2 constraint must be obeyed during this procedure. This can be used in those watermarking applications where joint-security-fidelity is required. For example, in transaction tracking applications, the use of different look-up 'tables results in unique embedded watermarks for each copy; if the multimedia work is subsequently leaked to the press or redistributed illegally, it is possible that the rights owner can identify who was responsible.

The significant coefficient selection method, described previously, may be applied to the above algorithm as well. Similar experimental results were obtained for this alternative embodiment as in the first embodiment described above. The first embodiment will be somewhat easier to implement and faster to run as, after the probability difference is calculated, operations need only be performed on the probability difference, rather than two separate probabilities.

2. Optimal Quantization Based Watermark

In another aspect, the methods described herein include a method of determining a quantization ensemble of quantizers for use in quantizing a signal for watermark embedding. The method, for each watermark value, calculates a probability density function for signal points where the watermark value is to be embedded. Based on the calculated probability density functions, a distortion function and a robustness function are formulated for an ensemble of quantizers. A given robustness or a given distortion is selected for the distortion and robustness functions. If a given robustness is selected then the distortion function is minimized for the given robustness, and an ensemble of quantizers is determined with parameters that comply with the minimized distortion function, the given robustness, and the robustness function. If a given distortion is selected then the robustness function is maximized for the given distortion. An ensemble of quantizers is determined that complies with the maximized robustness function, the given distortion, and the distortion function.

Alternatively, the method can be applied simply to select a given robustness, minimize distortion and determine an ensemble of quantizers that complies. Further alternatively, the method can be applied simply to select a given distortion, maximize robustness and determine an ensemble of quantizers that complies.

These methods will be described further herein within respect to use in quantization based information hiding (watermarking) for the design of non-uniform quantizers for robust information hiding. A robustness-distortion tradeoff is formulated into a Distortion-Robustness function D(R) and a Robustness-Distortion function R(D). The robustness of non-uniform quantization watermarking scheme is formulated in terms of the distances between the sets of reconstruction points of different quantization ensembles. The distortion can also be formulated as a function of the adjustment magnitude on the reconstruction points of all involved quantizers. Based on the formulated R(D) function, plus a given robustness or distortion constraint, a Lagrangian function is established. By solving it, robustness or distortion constrained optimal quantizers are achieved.

A series of experiments have been made, in which various distribution sources are used. Results show that the proposed nonuniform quantization embedding method achieves quantizers that perform better than existing scalar quantizer based watermarking schemes and can satisfy users' various robustness or fidelity requirements.

For robust data hiding and watermarking techniques, robustness of the hiding information and fidelity of the host data are two basic requirements. However, robustness and fidelity are always a pair of conflicting goals. A theoretical framework for the trade-off of these two requirements is used in the context of quantization based information hiding. By considering the optimization of each requirement while the other is fixed, a Distortion-Robustness function, D(R) and a Robustness-Distortion, R(D) are formulated. A new practical constructive algorithm is developed to calculate the R(D) or D(R) function.

The algorithm can then be used to design the optimal quantization based data hiding scheme based on R(D) criteria for given distortion or robustness constraint. Experimental results, discussed further later, show that an optimal quantization watermarking method can perform better than existing methods. The method lends itself to applications where distortion or robustness is specifically requested. Data hiding technologies have been developed and exploited in solving multimedia security management problems such as misuse and unauthorized manipulation and distribution.

Robustness to signal manipulation, amount of information that can be embedded and fidelity of the watermarked signal compose the primary but conflicting characteristics of information hiding. To achieve one property always means sacrificing the others. Consequently, watermarking scheme design is a typical application oriented question; the desired watermark achieves the optimal tradeoff between the three characteristics according to the application requirement.

An information hiding system may be defined as optimal watermarking when it achieves a maximum robustness subject to a given fidelity criterion or a minimum distortion subject to a given robustness requirement.

Optimization may be applied to watermarking methods to enhance their performance.

An optimal watermarking method is described herein that exploits the statistics of the host signal. Robustness of the watermark is maximized while maintaining a fixed fidelity (distortion) or the fidelity (distortion) is minimized while maintaining a fixed robustness. As part of an implementation of the method, a novel means of measuring fidelity and robustness is described.

Turning now to quantizers and quantization error, a scalar quantizer Q can be defined as a mapping between a source s to a reconstruction point r out of a finite reconstruction set. Generally it can be defined as:

$$r_k = Q(s) \text{ if } s \in [d_{k-1}, d_k] \quad (16)$$

where $d_k$, k=0, ..., K is the decision level of the quantizer Q and $r_k$, k=1, ..., K is the reconstruction points, see R. M. Gray and D. L. Neuhoff, "Quantization," *IEEE Trans. Inform. Theory*, vol. 44, no. 6, pp. 1-63, October 1998.

Quantization error (or distortion) is introduced by a quantizer when mapping a signal to a quantization value. The v-power difference distortion incurred by scalar quantization can be expressed as the sum of the distortions for each of the decision regions. The distortion produced by quantizing a discrete-time memory-less source s with a given K-levels quantizer Q can be formulated as:

$$D^{(v)} = E[|s - Q(s)|^v] \quad (17)$$

$$= \sum_{k=1}^{K} \int_{d_{k-1}}^{d_k} |s - Q(s)|^v f_s(s) ds$$

$$= \sum_{k=1}^{K} \int_{d_{k-1}}^{d_k} |s - r_k|^v f_s(s) ds$$

where $f_s(s)$ is the probability density function (PDF) of the source signal s.

Figure 11:
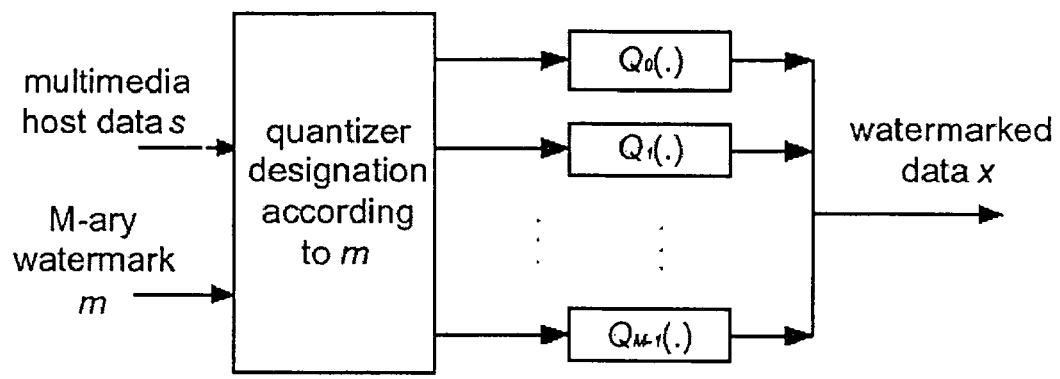
FIG. 11 is a schematic representation of a quantization-based information hiding (watermark embedding) system.

Referring to FIG. 11, a quantization-based information hiding system is represented. In quantization-based information hiding schemes, the watermark information is conveyed in the choice of quantizer. The watermark message symbol to be embedded is denoted by m ∈ {0, ..., M−1}, which is also called M-ary watermark. To embed M-ary watermark, M quantizers are needed. Each watermark message symbol is encoded to a choice of a quantizer. And the host signal is then quantized by this quantizer. For the watermark decoding, the received watermark signal is examined. A source quantizer is determined and a decision is then made to decode the watermark message symbol embedded in this signal sample.

For M-ary watermarking, the host source data s can be divided into M categories: the data that are used to embed message symbol m, denoted by $s_m$, m=0, ..., M−1. Suppose K level quantizers are used and they are denoted by $Q_m$ that is used to quantize data set $s_m$, m=0, ..., M−1. Further, the reconstruction points for $Q_m$ is denoted as $r_{m,k}$, k=1, ..., K, from (16) this results in:

$$r_{m,k} = Q_m(s_m), \text{ if } s_m \in [d_{m,k-1}, d_{m,k}], m=0, \ldots, M-1 \quad (18)$$

where $d_{m,k}$, k=0, ..., K are the decision levels of the quantizer $Q_m$.

Figure 13:
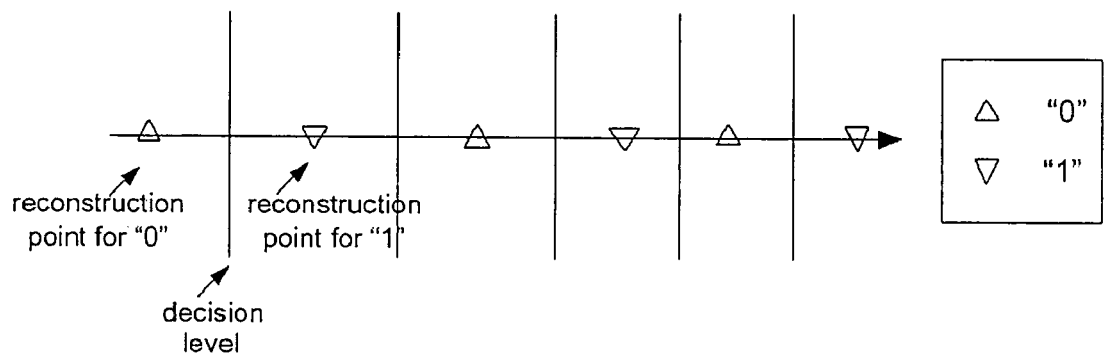
FIG. 13 is a block diagram of the general watermark detection procedure of FIG. 12.

Referring to FIG. 11, the message embedding procedure is illustrated. For message symbol m, the host data is mapped to the nearest reconstruction point of the quantizer $Q_m$. In another word, $s_m$ is quantized with $Q_m$. Referring to FIG. 13, an example of a binary quantization based data embedding is illustrated, where Δ and ∇ represent quantization points for "0" and "1" embedding respectively.

Figure 12:
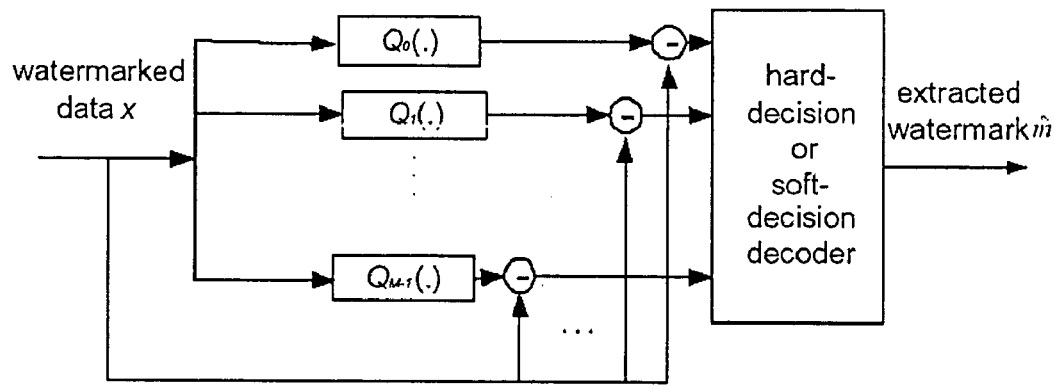
FIG. 12 is a schematic representation of a quantization-based information detecting (watermark detection) system.

Referring to FIG. 12, a block diagram of the general watermark decoding procedure is shown. The distance between the received signal y and the sets of reconstruction points of different quantizers are employed to determine which quantizer was used for quantization and then to estimate the embedded watermark bit. The distance may be calculated using hard-decision and soft-decision decoding algorithms.

For hard-decision decoding, one can make decisions on each received coded symbol y (such as described in B. Chen and G. W. Wornell Quantization Index Modulation: A Class of Provably Good Methods for Digital Watermarking and Information Embedding, *IEEE Trans. Inform. Theory*, Vol.

47, pp. 1423-1443, May, 2001, and B. Chen and G. W. Wornell An Information-theoretic Approach to the Design of Robust Digital Watermarking Systems, in *Proc. Int. Conf. Acoust., Speech, Signal Processing*, ICASSP'99, Vol. 4, pp. 2061-2064):

$$\hat{m} = \arg\min_{m} |y - Q_m(y)|^2 \quad m \in \{0, \ldots, M-1\} \quad (19)$$

where $\hat{m}$ is the decoded watermark symbol. Unless the channel noise is strong enough to drag the watermarked feature out of the enforced interval, the detection result is $\hat{m}=m$.

Alternatively, for soft-decision decoding, the message sequence to be embedded X is one of N binary sequences $X=X_n$, $n=1, \ldots, N$ where each possible sequence is composed of L message symbols $X_n = \{m_{n1}, \ldots, m_{nL}\}$. The extracted watermark $\hat{X}$ is determined by evaluating the square-sum of distance between the received signal $Y=\{y_1, \ldots y_L\}$ and the nearest set of quantization ensembles.

$$\hat{X} = \arg\min_{X_n} \sum_{l=1}^{L} |y_l - Q_{m_{nl}}(y_l)|^2, \quad (20)$$

$$m_{nl} \in \{0, \ldots, M-1\}, n = 1, \ldots, N \text{ and } l = 1, \ldots, L$$

For M-ary quantization based information hiding with K-level quantizers, the total distortion is the sum of quantization distortion of all the quantizers, i.e., $$D^{(v)} = \sum_{m=1}^{M-1} D_m^{(v)} = \sum_{m=1}^{M-1} \sum_{k=1}^{K} \int_{d_{k-1}}^{d_k} |s_m - r_{m,k}|^v f_m(s_m) ds_m \quad (21)$$

where $f_m(s_m)$ are the probability density functions (PDFs) of $s_m$.

In the special case of $v=2$, the difference distortion measure becomes the widely used mean square error (MSE) criterion, and a quantizer which minimizes $D^2$ is termed MSE-optimal or minimum mean-square-error (MMSE) quantizer. The quantization distortion will now be evaluated by MSE, which is denoted as D, $$D = \sum_{m=0}^{M-1} \sum_{k=1}^{K} \left[ \int_{d_{m,k-1}}^{d_{m,k}} |s_m - r_{m,k}|^2 f_m(s_m) ds_m \right] \quad (22)$$

It is desired to design a watermarking method such that the distortion is as small as possible.

When a soft-decision decoder as in (20) is used, the square-sum of distance between the received data and the sets of reconstruction points of different quantizers can be used to determine the embedded information. Assume K-level quantizers are used and the quantization reconstruction points of different quantizers are interleaved. The robustness measure of a quantization watermarking method is therefore defined as the overall mean squared distance between the nearest set of quantization ensembles, i.e., $$R = \sum_{k=1}^{K} \left[ \sum_{i=0}^{M-1} \sum_{j=0, j\neq i}^{M-1} |r_{i,k} - r_{j,k}|^2 \int_{d_{i,k-1}}^{d_{i,k}} f_i(s_i) ds_i \right] \quad (23)$$

$$= \sum_{k=1}^{K} \left[ \sum_{i=0}^{M-1} \sum_{j=0, j\neq i}^{M-1} |r_{i,k} - r_{j,k}|^2 P_{i,k} \right]$$

where $P_{i,k}$ is the probability that $s_i$ fall into the k-th quantization cell of $Q_i$ expressed as $$P_{i,k} = \int_{d_{i,k-1}}^{d_{i,k}} f_i(s_i) ds_i, i = 0, \ldots, M-1$$

Specifically, for binary watermarking, (23) becomes $$R = \sum_{k=1}^{K} \left[ |r_{0,k} - r_{1,k}|^2 \int_{d_{0,k-1}}^{d_{0,k}} f_0(s_0) ds_0 \right] + \quad (24)$$

$$\sum_{k=1}^{K} \left[ |r_{0,k} - r_{1,k}|^2 \int_{d_{1,k-1}}^{d_{1,k}} f_1(s_1) ds_1 \right]$$

$$= \sum_{k=1}^{K} (P_{0,k} |r_{0,k} - r_{1,k}|^2) + \sum_{k=1}^{K} (P_{1,k} |r_{0,k} - r_{1,k}|^2).$$

As stated previously, fidelity and robustness are always conflicting requirements in an information hiding system. A tradeoff between fidelity and robustness requirements needs to be devised in an information hiding system. Now, a framework of quantization based watermarking is used to find a set of quantization ensembles which achieve the maximum robustness R(D) subject to the given distortion D or achieve the minimum distortion D(R) subject to the given robustness R. Then two constrained optimization problems are formulated as: (1) given robustness criterion, looking for quantization encoding scheme which minimizes distortion; (2) given fidelity constraint, looking for quantization encoding scheme which maximizes robustness.

The robustness-distortion function R(D) is defined as the maximum R given the distortion D, i.e., R(D)=maxD(R). Similarly, the distortion-robustness function D(R) is to describe the minimum distortion subject to fixed robustness, D(R)=min R(D). Apparently, D(R) is the inverse function of R(D).

Figure 14:
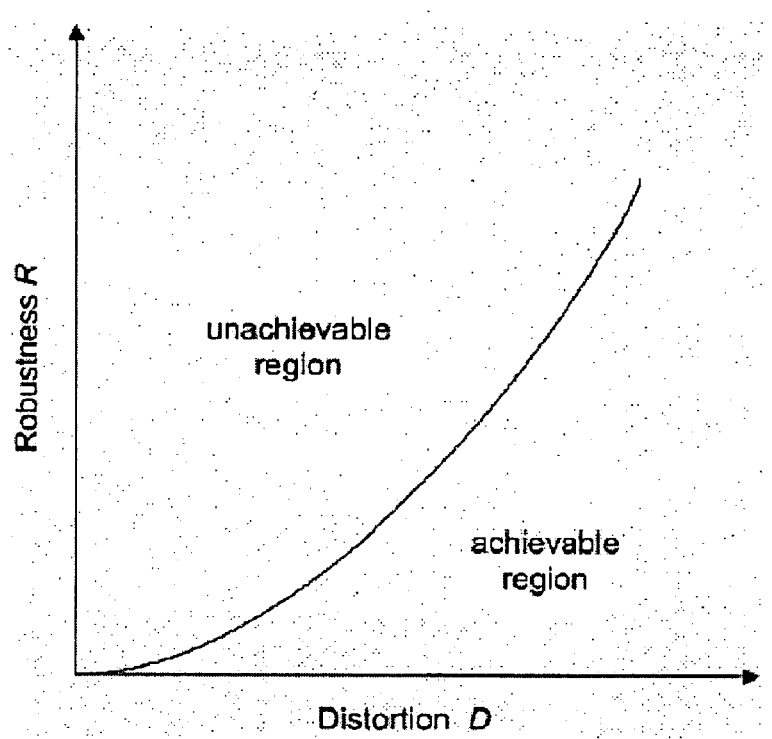
FIG. 14 is a graph of a generic relationship between robustness and distortion.

Referring to FIG. 14, the relationship between distortion and robustness is demonstrated. The curve shows the maximum robustness given distortion. Therefore, the region below the R(D) curve is achievable and the region above it is unachievable.

Figure 15:
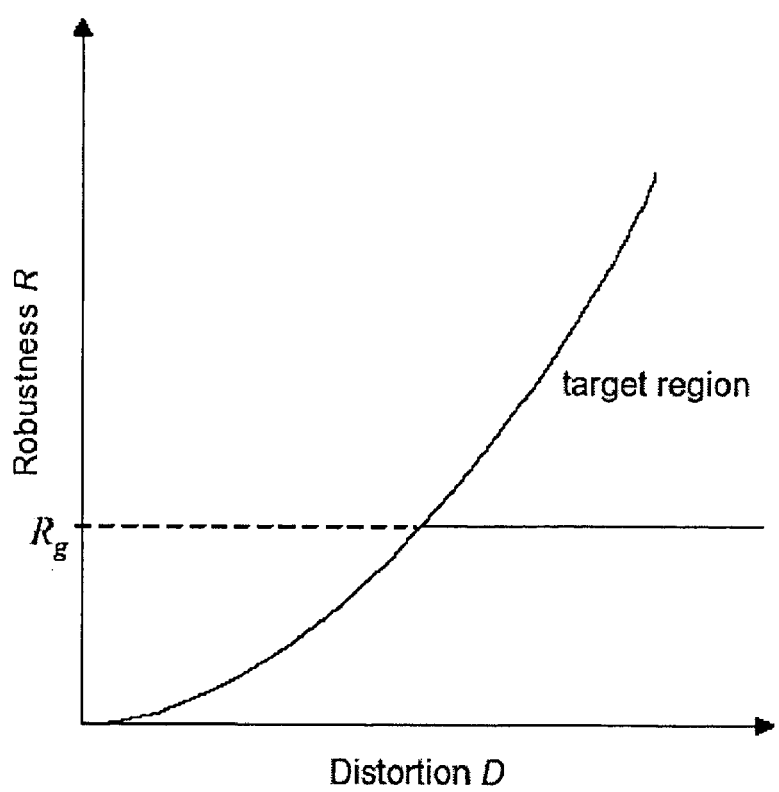
FIG. 15 is the graph of FIG. 14, where a minimum robustness is selected.

Referring to FIG. 15, a first constrained optimization problem is illustrated, the region above the given robustness $R_g$ and below R(D) curve satisfies the robustness criterion. At the position where the horizontal line of $R_g$ intersects the R(D) curve, quantization encoding scheme minimizes distortion subject to $R_g$.

Figure 16:
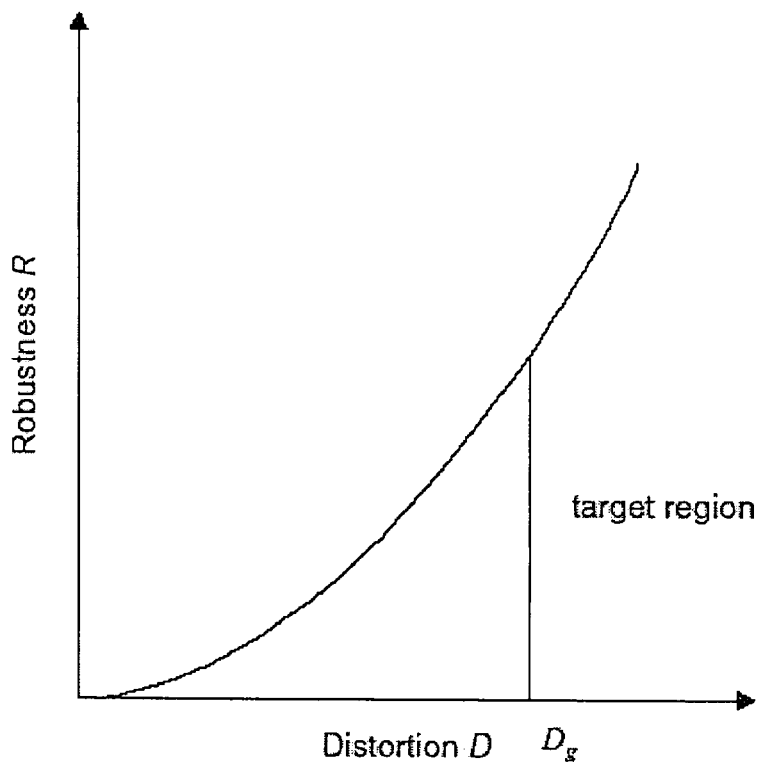
FIG. 16 is the graph of FIG. 14, where a minimum distortion is selected.

Referring to FIG. 16, a quantization embedding method that achieves maximum robustness subject to given distortion is illustrated. Only the region to the right of the given distortion $D_g$ and below R(D) curve satisfies the specified distortion criterion. At the position where the line of $D=D_g$ intersects the curve, the robustness is the maximum.

The R(D) function is a monotonic non-decreasing function. According to the definition of R(D), among all possible quantizers ensembles which generate equal or less than the given distortion $D_g$, the quantizers ensembles which achieve the maximum robustness are selected. When the allowable distortion $D_g$ increases to $D'_g$, the set of quantizer ensembles that can be selected is enlarged such that it includes all quantizers subject to original $D_g$. Now searching the maximum robustness among this extended set of quantizer ensembles, clearly the maximum achievable robustness will increase, or at least remain unaltered. So R(D) is non-decreasing with increased allowable distortion $D_g$. As R(D)'s inverse function, D(R) function is also monotonous non-decreasing.

Turning to the domain of definition of R(D) and D(R). For given host data $s_0$ and $s_1$, the minimum and maximum distortions are denoted as $D_{min}$, $D_{max}$, respectively. The achievable maximum robustness is denoted as $R_{max}$. Their properties may be briefly discussed as follows, as well as the robustness corresponds to the minimum distortion $R(D_{min})$.

$D_{min}$ and $R(D_{min})$

First, consider the minimum distortion where the host data and the quantization level are given. Without robustness concern, the desired quantizer ensembles is simply the optimal MMSE quantizers in which the decision levels and reconstruction points are selected that minimize the distortion subject to the quantization level constraint, i.e., $$D_{min} = \min\left\{\sum_{m=0}^{M-1} \sum_{k=1}^{K} \left[\int_{d_{m,k-1}}^{d_{m,k}} |s_m - r_{m,k}|^2 f_m(s_m) ds_m\right]\right\} \quad (25)$$

Depending on the distribution of s, the watermarking method based on the achieved optimal quantizers have certain robustness. If the distributions of all $s_m$, m=0, ..., M−1 are similar, the reconstruction points of the all optimal quantizers are also similar. Then the watermarking system will have poor robustness performance. If all the quantizers are exactly the same then $R(D_{min})$=0.

$R_{max}$ and $D(R_{max})$

For binary watermarking model, the maximum robustness is obtained when the data to be marked "0" is mapped to the minimum value that the data can be changed to and the data to be marked "1" is mapped to the maximum value or vice versa. The distortion is then $$D(R_{max}) = \int_{\eta_{min}}^{\eta_{max}} (s_0 - \eta_{min})^2 f_0(s_0) ds_0 + \int_{\eta_{min}}^{\eta_{max}} (\eta_{max} - s_1)^2 f_1(s_1) ds_1 \quad (26)$$

where $\eta_{min}$ and $\eta_{max}$ are the possible minimum and maximum of the host data, respectively.

Implementation of optimal information hiding will now be discussed. For simplification and clarity, the remaining discussion will primarily focus on a binary watermarking model, where two quantizers are needed for watermarking. It is to be understood that the analysis results apply equally to generalized M-ary watermarking.

Referring to FIG. 15 and FIG. 16, the performance of optimal quantization based watermarking scheme is represented by a point on the curve with given distortion $D_g$ or given robustness $R_g$. An implementation for optimal quantization watermarking scheme which targets to the R(D) curve will now be discussed.

Leaving the robustness requirement aside, to achieve the minimum distortion due to the quantization operation, the $Q_0$ and $Q_1$ quantizers should be the minimum-distortion quantizers for feature to be embed "0" and "1" respectively.

The problem of minimum-distortion quantization design is to select decision levels and reconstruction points that minimize distortion subject to a constraint on the number of levels K. This amounts to the simple requirement that the partial derivatives with respect to the decision levels and reconstruction points be zero (see, for example, S. P. Lloyd, "Least squares quantization in PCM," *IEEE Trans. Inform. Theory*, vol. IT-28, no. 2, pp. 129-137, March 1982; J. Max, "Quantizing for minimum distortion," *IRE Transaction on Information Theory*, vol. IT-6, pp. 7-12, March 1960; and R. M. Gray and D. L. Neuhoff, "Quantization," *IEEE Trans. Inform. Theory*, vol. 44, no. 6, pp. 1-63, October 1998):

$$\frac{\partial D^2}{\partial d_k} 0, k=1, \ldots K-1 \quad \frac{\partial D^2}{\partial r_k} = 0, k=1, \ldots K \quad (27)$$

Solving equations (27), the necessary conditions for a fixed-rate quantizer to be locally optimal (minimum-distortion) can be obtained, (see for example S. P. Lloyd cited above) i.e., the decision level $d_k$, k=0, ... K−1 is the mean of the surrounding quantization levels, $$d_k = \frac{r_k + r_{k+1}}{2} \quad (28)$$

and the reconstruction point $r_k$, k=0, ... K corresponding to a given cell is the centroid of the source value given that it lies in the specific cell, $$r_k = \frac{\int_{d_{k-1}}^{d_k} s f_s(s) ds}{\int_{d_{k-1}}^{d_k} f_s(s) ds} \quad (29)$$

By applying these conditions on $s_0$ and $s_1$, the MMSE quantizers $Q_0$ and $Q_1$ can be obtained for $s_0$ and $s_1$, respectively.

Figure 17:
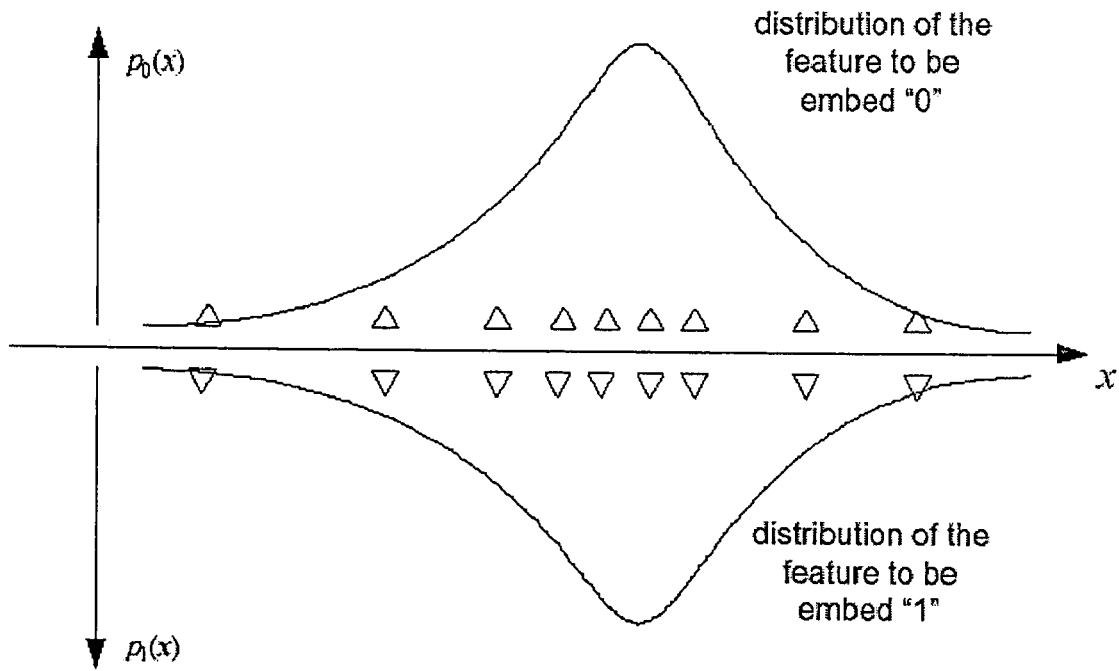
FIG. 17 is a graph of two similar probability density functions for an image with the Δ points and ∇ points representing the optimal quantizers for "0" LUT embedding and "1" LUT embedding respectively.

However, if the binary watermark is distributed randomly, it is likely that the PDF of $s_0$ is similar to the PDF of $s_1$. Since the MMSE quantizer is determined by the signal's statistical distribution, if the $s_0$ and $s_1$ have similar PDFs and their quantizers have the same quantization levels, the two obtained MMSE quantizers are similar, that is for any i, 1<i<L, $r_{i,0} \approx r_{i,1}$ and for any j, i≠j $Dist(r_{i,0}, r_{i,1}) << Dist(r_{i,0}, r_{j,1})$ $Dist(r_{i,0}, r_{i,1}) << Dist(r_{i,0}, r_{j,0})$ $Dist(r_{i,0}, r_{i,1}) << Dist(r_{i,1}, r_{j,0})$ $Dist(r_{i,0}, r_{i,1}) << Dist(r_{i,1}, r_{j,1})$ where Dist(.) denotes the distance between two reconstruction points. Referring to FIG. 17, the two PDFs are plotted and the Δ points and ∇ points represent the optimal quantizers for "0" embedding and "1" embedding respectively.

Figure 18:
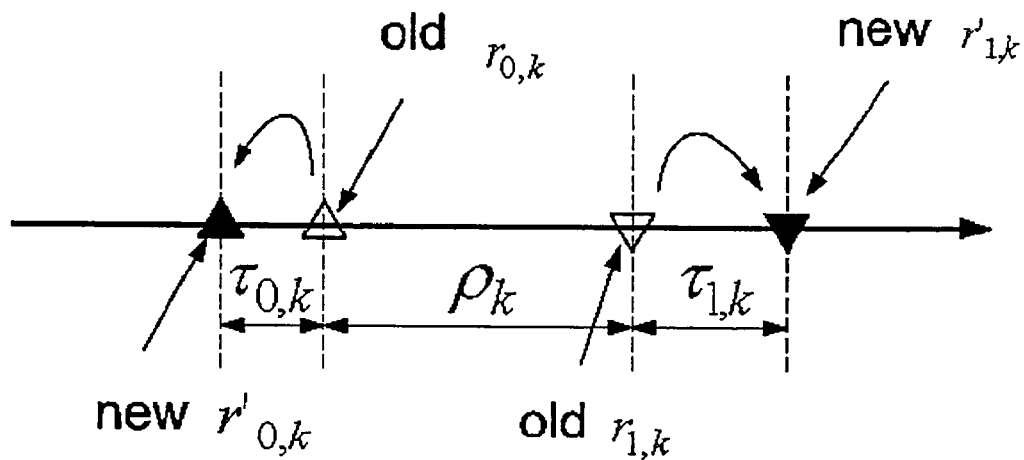
FIG. 18 is line chart that illustrates adjustment of reconstruction points to achieve optimal distortion-robustness tradeoff.

Referring to FIG. 18, the distances between the corresponding reconstruction points of different MMSE quantizers $Q_0$ and $Q_1$, i.e. $Dist(r_{i,0}, r_{i,1})$, are so small that the embedded watermark can be destructed even by a faint perturbation. Intuitively, the two quantizers need to be adjusted by enlarging $Dist(r_{i,0}, r_{i,1})$ to improve the robustness of the watermarking scheme. For example, if the i-th reconstruction point of 0's quantizer, $r_{i,0}$ is close to but less than $r_{i,1}$, to decrease the error probability, $r_{i,0}$ can be reduced and $r_{i,1}$ can be increased. However, the quantization distortions are increases. In the following, the relationship between the quantization distortion and the robustness is formulated in detail and a practical method is presented to find the optimal watermarking scheme according to the R-D criteria discussed above. The minimum distortion produced by quantizing source s with K level MMSE quantizers is $$D_{min} = \sum_{k=1}^{K} \int_{d_{k-1}}^{d_k} |s - r_k|^2 f_s(s) ds \quad (30)$$

where $d_k, k=0, \ldots, K$ and $r_k, k=1, \ldots, K$ are the decision levels and reconstruction points of the MMSE quantizer for the source s. The reconstruction points are optimal in the MSE sense such that any changes on them will introduce further distortion. Assume that the k-th optimal quantization point $r_k$ is moved to $r'_k$, the distortion of the new quantizer becomes $$D_w = \sum_{k=1}^{K} \int_{d_{k-1}}^{d_k} |s - r'_k|^2 f_s(s) ds \quad (31)$$

$$= \sum_{k=1}^{K} \int_{d_{k-1}}^{d_k} |s - r'_k + r_k - r_k|^2 f_s(s) ds$$

$$= \sum_{k=1}^{K} \int_{d_{k-1}}^{d_k} |s - r_k|^2 + |r_k - r'_k|^2 + 2|r_k - r'_k||s - r_k| f_s(s) ds$$

According to 29:

$$\int_{d_{k-1}}^{d_k} r_k f_s(s) ds = \int_{d_{k-1}}^{d_k} s f_s(s) ds \quad (32)$$

Therefore, $$D_w = \sum_{k=1}^{K} \int_{d_{k-1}}^{d_k} |s - r_k|^2 + |r_k - r'_k|^2 f_s(s) ds \quad (33)$$

$$= \sum_{k=1}^{K} \int_{d_{k-1}}^{d_k} |r_k - r'_k|^2 ds + D_{min}$$

In our binary quantizer case, the total distortion is $$D_w = \sum_{k=1}^{K} \int_{d_{0,k-1}}^{d_{0,k}} |r_{0,k} - r'_{0,k}|^2 f_s(s_0) ds_0 + \quad (34)$$

-continued $$D_{0,min} + \sum_{k=1}^{K} \int_{d_{1,k-1}}^{d_{1,k}} |r_{1,k} - r'_{1,k}|^2 f_s(s_1) ds_1 + D_{1,min} =$$

$$\sum_{k=1}^{K} \int_{d_{0,k-1}}^{d_{0,k}} \tau_{0,k}^2 f_s(s_0) ds_0 + D_{0,min} +$$

$$\sum_{k=1}^{K} \int_{d_{1,k-1}}^{d_{1,k}} \tau_{1,k}^2 f_s(s_1) ds_1 + D_{1,min}$$

where $D_{0,min}$ and $D_{1,min}$ are the distortions of the initial optimal MMSE quantizers $Q_0$ and $Q_1$, respectively, and $\tau_{m,k}$ denote the difference between the new reconstruction points and the corresponding reconstruction points in the MMSE quantizers:

$$\tau_{m,k} = r_{m,k} - r'_{m,k}, \, m=0,1 \text{ and } k=1,\ldots,K \quad (35)$$

Taking the distributions of the host data $s_0$ and $s_1$ into account, according to 24, the robustness measurement after adjustment of the reconstruction points is $$R = \sum_{k=1}^{K} \left[ P_{0,k} |r'_{0,k} - r'_{1,k}|^2 + \sum_{k=1}^{K} [P_{1,k} |r'_{0,k} - r'_{1,k}|^2 \right. \quad (36)$$

$$= \sum_{k=1}^{K} \left[ P_{0,k} (\tau_{0,k} + \rho_k + \tau_{1,k})^2 + \sum_{k=1}^{K} [P_{1,k} (\tau_{0,k} + \rho_k + \tau_{1,k})^2 \right.$$

where $\rho_k = r_{1,k} - r_{0,k}, k=1, \ldots, K$ is the distance between the reconstruction points of the initial $Q_0$ and $Q_1$ quantizers.

Then, the optimal quantization based watermarking can be formulated into a Lagrangian function according to the proposed R-D criteria, $$J(\tau_{0,k}, \tau_{1,k}) = -R + \lambda D \quad (37)$$

$$= -\sum_{k=1}^{K} [P_{0,k}(\tau_{0,k} + \rho_k + \tau_{1,k})^2] -$$

$$\sum_{k=1}^{K} [P_{1,k}(\tau_{0,k} + \rho_k + \tau_{1,k})^2] +$$

$$\lambda \left[ D_{0,min} + \sum_{k=1}^{K} P_{0,k} \tau_{0,k} + D_{1,min} + \sum_{k=1}^{K} P_{1,k} \tau_{1,k} \right]$$

where λ is an unknown quantity that is to be solved. The cost function measures the MSE between the original data and the watermarked data. Since the MMSE quantizers can be obtained first, $D_{0,min}$ and $D_{1,min}$ are supposed to be known as well as $\rho_k$, the initial distances between $Q_0$ and $Q_1$ quantizer points. A simple solution to the above equation is that the partial derivatives of J with respect to $\tau_{0,k}$ and $\tau_{1,k}$ be zero.

$$\frac{\partial J}{\partial \tau_{0,k}} = \quad (38)$$

$$-2P_{0,k}(\tau_{0,k} + \rho_k + \tau_{1,k}) - 2P_{1,k}(\tau_{0,k} + \rho_k + \tau_{1,k}) + 2\lambda P_{0,k} \tau_{0,k} = 0$$

-continued $$\frac{\partial J}{\partial \tau_{1,k}} = \tag{39}$$
$$-2P_{0,k}(\tau_{0,k}+\rho_k+\tau_{1,k})-2P_{1,k}(\tau_{0,k}+\rho_k+\tau_{1,k})+2\lambda P_{1,k}\tau_{1,k}=0$$

So that:

$$\tau_{0,k} = \frac{(P_{0,k}+P_{1,k})(\rho_k+\tau_{1,k})}{(\lambda-1)P_{0,k}-P_{1,k}}, \tag{40}$$

$$\tau_{1,k} = \frac{(P_{0,k}+P_{1,k})(\rho_k+\tau_{0,k})}{(\lambda-1)P_{1,k}-P_{0,k}}, k=1, \ldots, K$$

Thus, there are 2K equations for 2K+1 real variables ($\tau_{0,k}$, $\tau_{1,k}$, k=1, ..., K and $\lambda$). The specified robustness condition, $$R = \sum_{k=1}^{K}[P_{0,k}(\tau_{0,k}+\rho_k+\tau_{1,k})^2 + \tag{41}$$
$$\sum_{k=1}^{K}[P_{1,k}(\tau_{0,k}+\rho_k+\tau_{1,k})^2 \geq R_g$$

or fidelity condition, $$D = D_0 + \sum_{k=1}^{K} P_{0,k}\tau_{0,k}^2 + D_1 + \sum_{k=1}^{K} P_{1,k}\tau_{1,k}^2 \leq D_g \tag{42}$$

makes the variables in k, l and $\lambda$ solvable.

Figure 19:
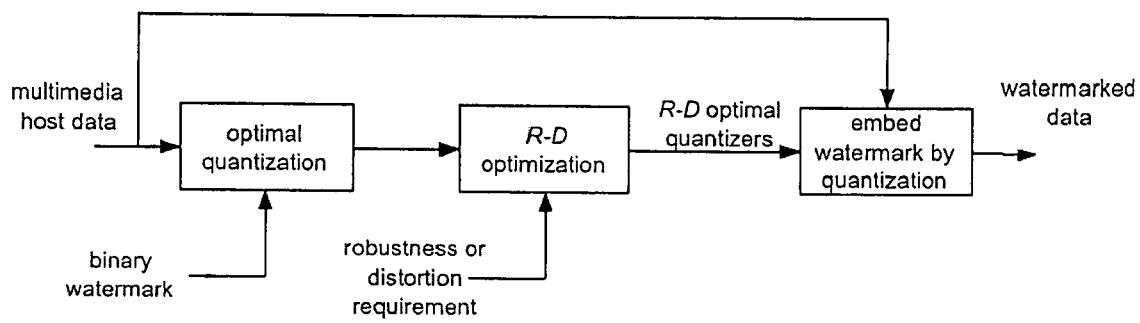
FIG. 19 is a schematic representation of a watermark embedding method using optimal quantization in accordance with a preferred embodiment of the invention.

Referring to FIG. 19, the steps involved in the watermark embedding process are shown. The procedure can be generally summarized as:

Step one: Select coefficients from the multimedia work to be embedded watermark and generate the hidden data which is a collection of bits.

Step two: The MMSE quantizers are obtained according to (28) and (29) for host signal to be embedded "0" and "1" respectively. The distortions introduced by the MMSE quantizers and other conditions of them are kept for the next step of calculation.

Step three: A Lagrangian function J is formulated according to the proposed R or D criteria: J=$\lambda$D−R if it is desired to maximize robustness subject to distortion constraint and J=D−$\lambda$R, suppose minimum distortion subject to fixed robustness constraint is desired. Then the quantization ensembles which are optimal subject to given robustness or distortion constraint are the values of $\tau_0$, $\tau_1$ which satisfy the first order conditions, i.e. (38) and (39).

Step four: The final step is to use the achieved R-D optimal quantizers to apply quantization based watermark embedding according to (18).

The detection system, which has knowledge of R-D optimal quantizers, extracts watermark by evaluating the square-sum of distance between the received signal and the nearest set of quantization ensembles.

Some experimental results demonstrate the performance of the proposed scheme on sources that are subject to various distributions. To demonstrate the necessity of the adjustments on the quantizers, the robustness of the data hiding schemes with and without quantizers adjustment are compared. Since uniform quantization based odd-even embedding (see for example M. Wu, "Joint Security and Robustness Enhancement for Quantization Based Data Embedding," IEEE Trans. on Circuits and Systems for Video Tech, Vol. 13, pp. 831-841, August 2003) is widely used in information hiding systems, this algorithm was used as a comparison in the experiments.

Multimedia data can be depicted by various distributions, for example, image signal is often modelled as Laplace distribution or generalized Gaussian distribution. For each distribution except uniform distribution, the obtained optimal quantizer is always totally different from and outperforms uniform quantizer. Meanwhile, uniformly distributed multimedia data is quite rare, so the optimal quantization based embedding scheme will typically be more effective than uniform scalar quantization based embedding scheme in solving multimedia information hiding problems.

Figure 20:
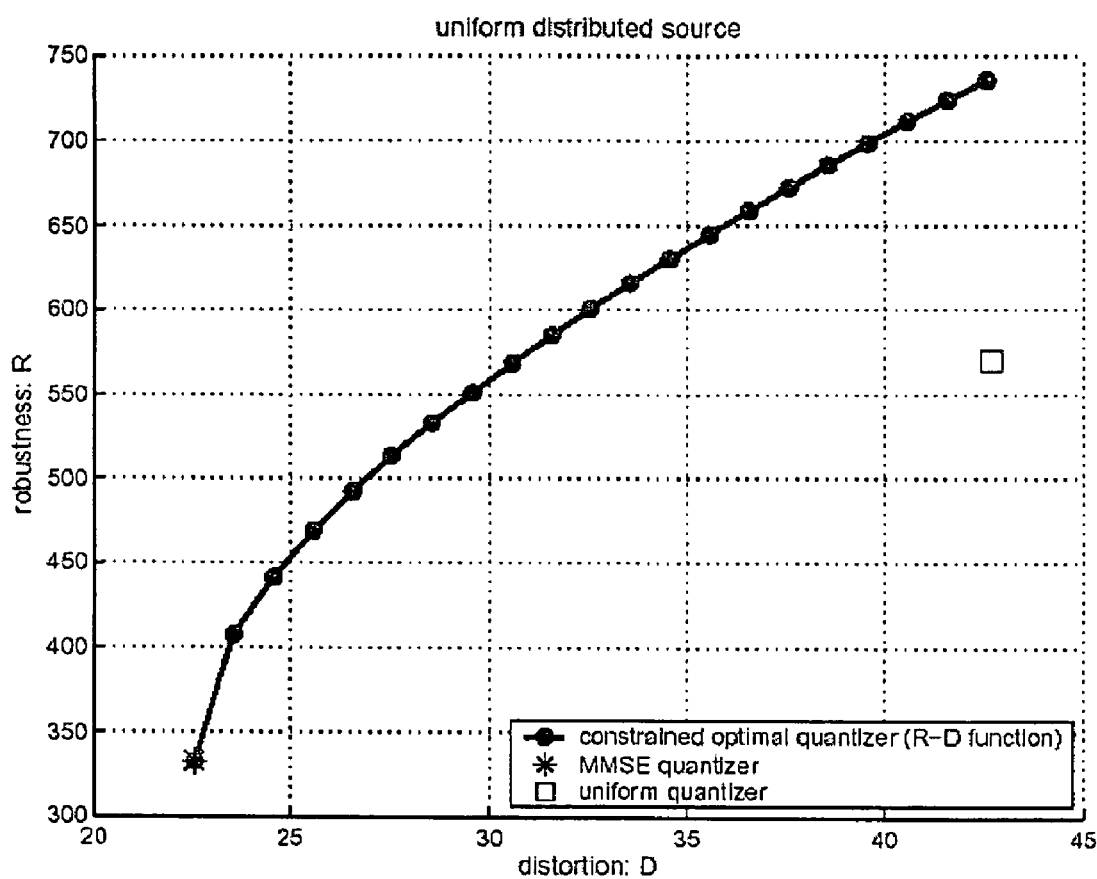
FIG. 20 is a graph illustrating robustness-distortion performance of various quantizers with uniform distributed source.
Figure 21:
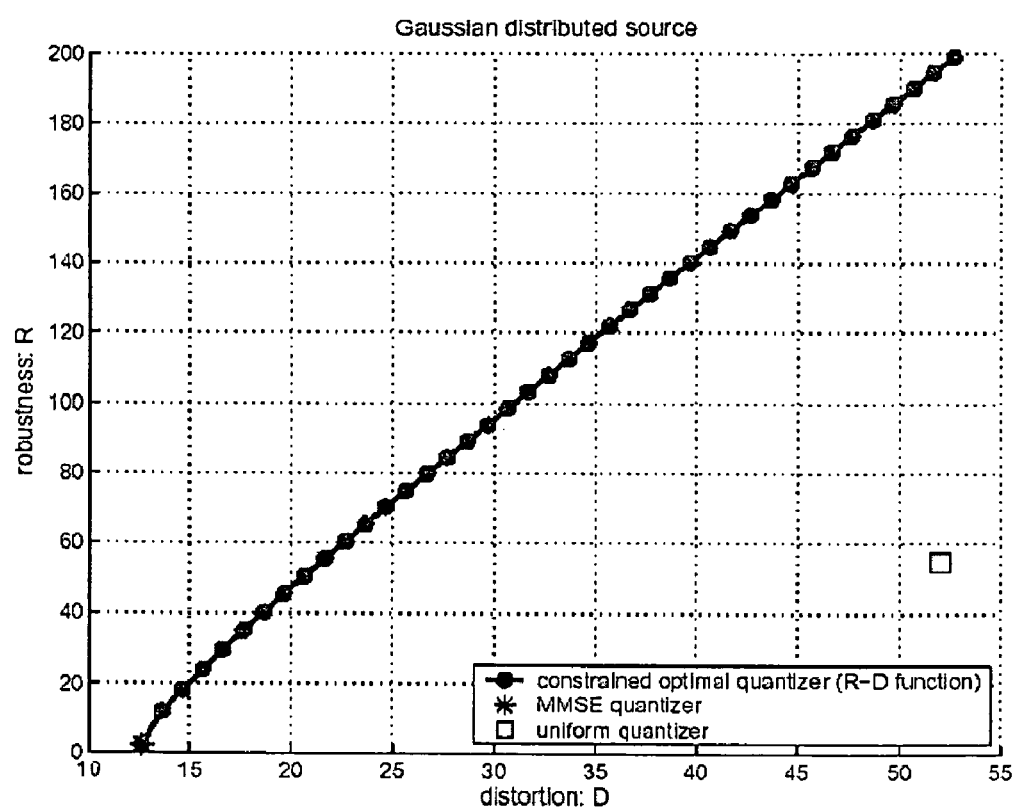
FIG. 21 is a graph illustrating robustness-distortion performance of various quantizers with Guassian distributed source.

First, the robustness of three quantization strategies on a uniformly distributed source will be examined. Referring to FIG. 20, it is shown that the performances of the uniform quantizer and the MMSE quantizer are two single points in the Robustness-Distortion coordinate. That is because, given a source, there is only one fixed-level uniform quantizer and minimum-distortion quantizer. Referring to FIG. 21, the quantizers adjustment in accordance with the given robustness or distortion criterion generates various sets of quantization ensembles, which robustness-distortion performance is represented by a R-D curve. Because robustness is improved by adjusting the MMSE quantizers, the performance of MMSE quantizer is always at the lowest border of the R-D curve. Compared with the uniform quantization, there are quantization ensembles that present about 29.4% higher robustness at the same expense of distortion, or same robustness with 43% less distortion.

Second, a Gaussian distributed source is exploited to evaluate the performance of the new scheme. The constrained Robustness-Distortion optimal quantizers have better performance than the uniform quantizer. The point that represents the performance of the uniform quantizer is below the R-D curve. The quantization ensembles obtained with quantizers adjustment method present about 280% higher robustness than the uniform quantization ensembles at the same expense of distortion. Show the same robustness, the constrained optimal quantizers have 62.4% less distortion than the uniform quantizers.

Figure 22:
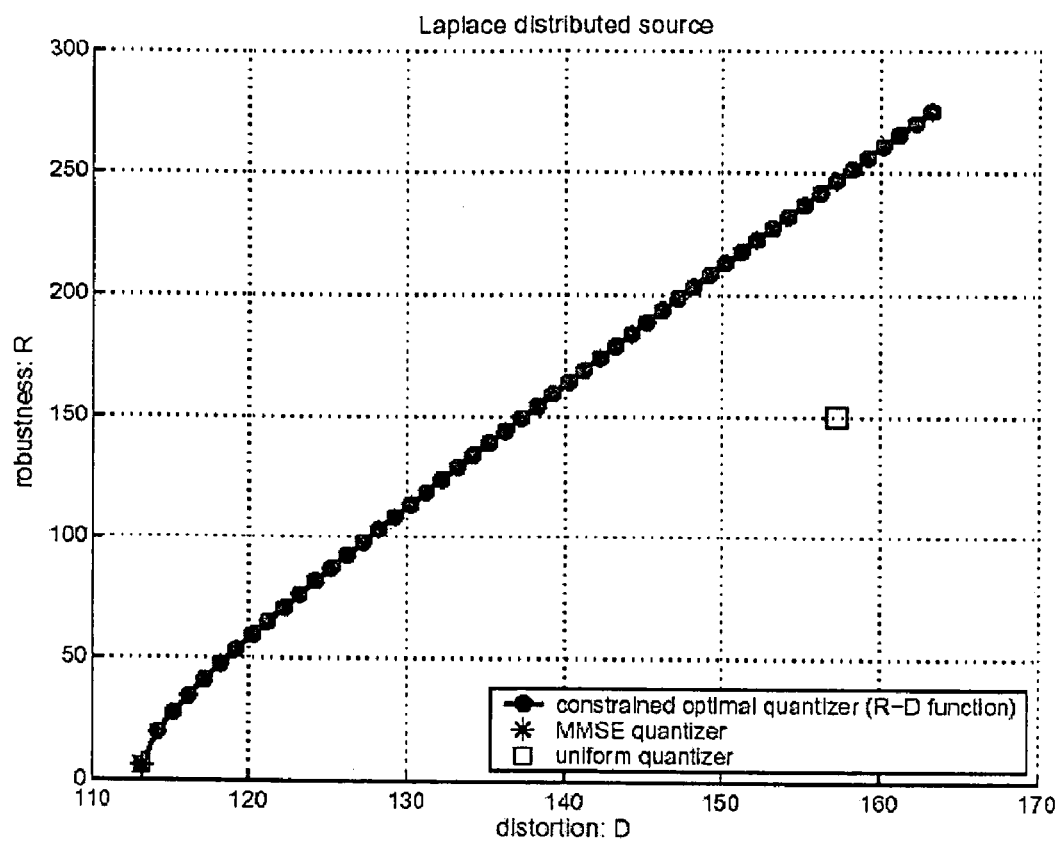
FIG. 22 is a graph illustrating robustness-distortion performance of various quantizers with Laplace distributed source.
Figure 23:
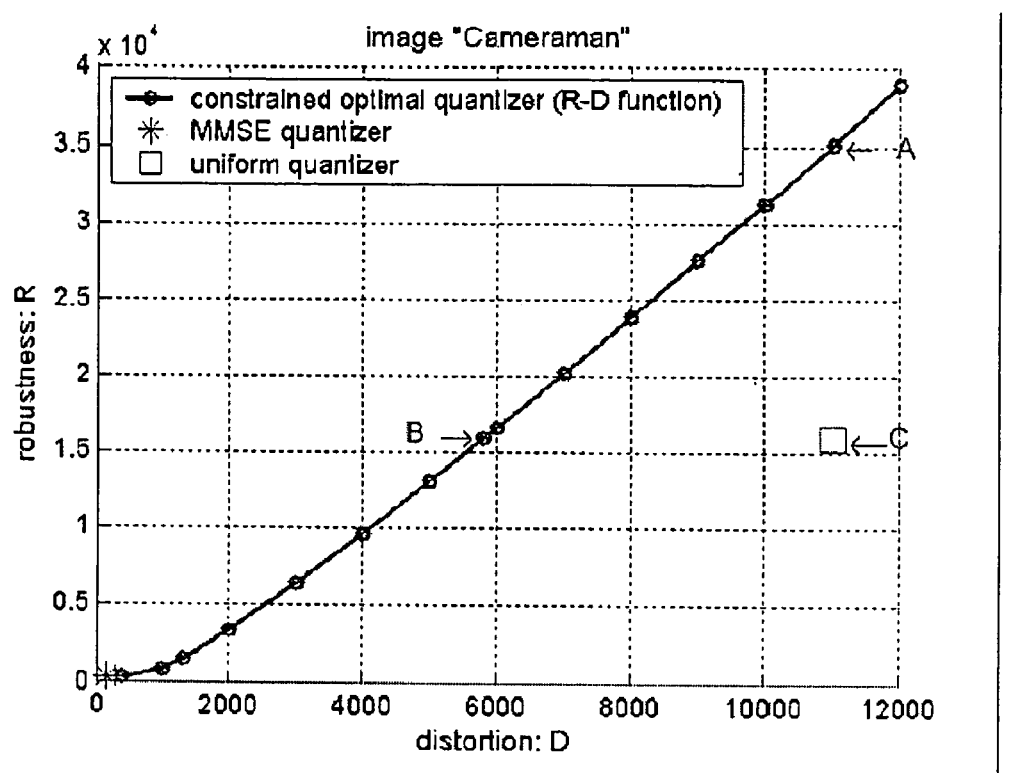
FIG. 23 is a graph illustrating robustness-distortion performance of various quantizers with a "cameraman" image.

Referring to FIG. 22, the performance of the method on a Laplace distributed source is shown. The quantization ensembles generated with the optimal quantizers show about 100, relatively 65.2% higher robustness than the uniform quantization ensembles or 11.7% fidelity advantage over the uniform quantization strategy.

Referring to FIGS. 23-26, the performance of the new non-uniform quantizer method is evaluated on a digital image "Cameraman". This shows non-uniform quantizers can be achieved that perform better than the uniform quantizer. The robustness of the non-uniform quantization can be 110% higher than the uniform quantizer at the same expense of distortion. Quantizers can also be found which show the same robustness to the uniform quantizer but about 47% less distortion.

The Lagrange method is a method used for constraint optimization. Suppose it is desired to maximize (or minimize) a function of n variables:

$$f(x)=f(x_1, x_2, \ldots, x_n) \text{ for } x=(x_1, x_2, \ldots, x_n) \tag{43}$$

subject to p constraints $g_1(x)=c_1$, $g_2(x)=c_2$, ..., $g_p(x)=c_p$

The first step of Lagrange's solution is to introduce p new parameters and write down the Lagrangian function:

$$L=f(x_1, x_2, \ldots, x_n)+\lambda_1 g_1(x)+\lambda_2 g_2(x)+\ldots+\lambda_p g_p(x), \tag{44}$$

the new parameters λ is called the Lagrange multiplier. L has become the function that it is desired to maximize. Therefore, take partial derivatives of L and set them equal to zero. Hence the constrained optimization problem is formulated and solved by the following theorem.

Assuming appropriate smoothness conditions, minimum or maximum of f(x) subject to the constraints that is not on the boundary of the region where f(x) and $g_j(x)$ are defined can be found by introducing p new parameters $\lambda_1, \lambda_2, \ldots, \lambda_p$ and solving the system $$\frac{\partial}{\partial x_i}\left(f(x) + \sum_{j=1}^{p} \lambda_j g_j(x)\right) = 0, 1 \leq i \leq n$$

$$g_j(x) = c_j, 1 \leq j \leq p$$

This amounts to solving n+p equations for the n+p real variables in x and λ.

3. Adaptive Watermarking Method for Lossy Compression

It has been noticed that image compression and image watermarking share some common characteristics (see, for example, P. Su, H. M. Wang, C. C. J. Kuo, "An integrated Approach to Image Watermarking and JPEG-2000 Compression", *Journal of VLSI Signal Processing*, vol. 27, pp.35-53, 2001). Significant frequency coefficients are encoded first both in image compression and in image watermarking. Hence by integrating frequency domain watermarking algorithm with compression processes, expensive image transform computation can be saved. On the other hand, combining image coding and image watermarking is highly desired in some classical applications, such as copyright protection, copy and access control and annotation through internet, where image compression is performed before spreading abroad.

A method of integrating image watermarking and compression is set out herein. Also described is a method of adapting the strength of watermarks to the amount of compression using a mapping. It is to be recognized that the embedding of the watermark could be performed before, during or after the compression while maintaining some of the benefits of the adaptive watermark strength. Although it is possible to imbed the watermark before compression, it is not preferred as the watermark will be distorted during the compression process.

The method will be described specifically with respect to use with the latest still image compression standard, JPEG2000. It is to be noted that the method is also applicable to other lossy compression methods, such as for example the original JPEG compression standard. The JPEG2000 image compression system has a rate-distortion advantage over the original JPEG compression standard (see, for example, C. Christopoulos, A. Skodras, T. Ebrahimi, "The JPEG2000 Still Image Coding System: An Overview", *IEEE Trans. on Consumer Electronics*, vol. 46, no. 4, pp. 1103-1127, November 2000; and M. Rabbani, R. Joshi, "An Overview of the JPEG 2000 Still Image Compression Standard", *Signal Processing: Image Communication*, 2000). It provides subjective image quality performance superior to existing standards. Due to Embedded Block Coding with Optimized Truncation (EBCOT), it allows progressive transmission by quality, resolution, component, or spatial locality.

Figures 24, 25, 26:
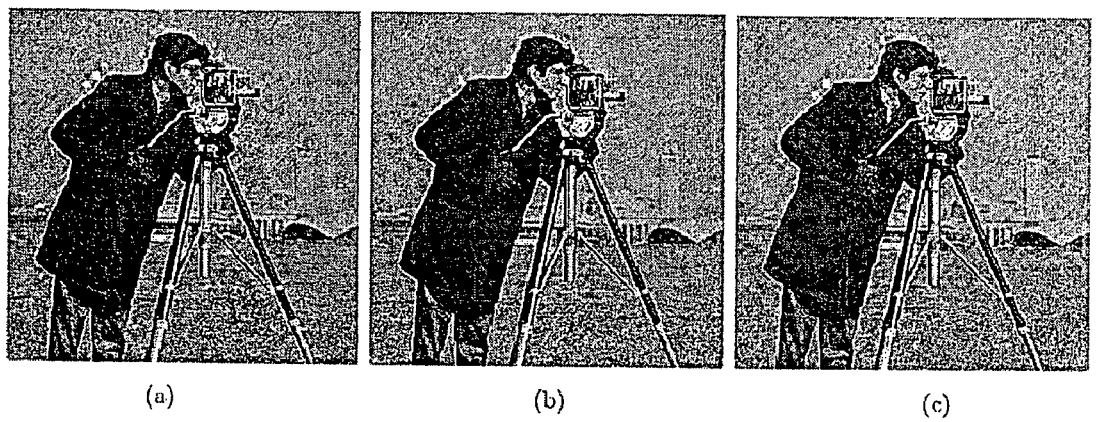
FIG. 24 is the "cameraman" image watermarked at point A of FIG. 23.
FIG. 25 is the "cameraman" image watermarked at point B of FIG. 23.
FIG. 26 is the "cameraman" image watermarked at point C of FIG. 23.

The block diagram of the JPEG2000 encoder is illustrated in FIG. 25. Discrete wavelet transform (DWT) is first applied to the source image data. The transform coefficients are then quantized and entropy coded, before forming the output codestream. The decoder is the reverse of the encoder. The codestream is first entropy decoded, de-quantized and inverse discrete transformed, thus resulting in the reconstructed image data.

In JPEG2000, to generate an optimal image for a target file size (bit-rate), a rate control process is performed after entropy coding. The rate control algorithm finds the optimal bit allocation for all code-blocks, such that the total distortion is minimized subject to the target bit-rate. Clearly the distortion brought by the rate control threatens the existence of any embedded watermark. In the watermarking method described herein, wavelet coefficients are modified depending on the compression ratio (bit-rate). A weak watermark is embedded into a mildly compressed image, while a strong watermark is applied to heavily compressed image.

In method described herein the strength of watermark is related to the compression ratio or bit-rate. For mild compression, the rate distortion is small and the strength of the watermark should be low to maintain the best image quality possible. Similarly, for higher compression ratio, the strength of the watermark is high enough to survive strong distortion caused by rate control. Furthermore, with declined image quality caused by compression, even a strong watermark becomes imperceptible.

It is shown that this adaptive method integrates with JPEG 2000 standard very well. The watermark is detected in a simple and fast way without assistance from either the original image or the reference watermarks. Meanwhile, by taking into account the compression ratio, the tradeoff between imperceptibility and robustness is balanced.

Watermark Embedding

In the adaptive watermarking method, a watermark is embedded into the sub-bands with intermediate resolution after stages of quantization and region of interests (ROI) scaling. During the stage of quantization, a wavelet coefficient $y_b(u,v)$ in subband b is mapped to a quantized index value $q_b(u,v)$. It is then normalized as the most significant bit (MSB) carrying the sign bit and the remaining bits represent the absolute magnitude of the coefficient. In this work, we assume that 8 bits are utilized to represent the integer part of $q_b(u,v)$. Thus the values of wavelet coefficients fall into [−255,255]. For wavelet coefficients, the operation of finding the optimal truncation point is the same as performing an optimal non-uniform scalar quantization. Table 1 shows the value of some wavelet coefficients before and after rate allocation with different target bit-rate φ. As can be seen, the degree of quantization highly depends on φ. For watermark embedding, it is not necessary to estimate the accurate quantization step. A coarse quantization interval Q is estimated as a parameter to determine the watermarking embedding level. A little bit larger Q than the true quantization interval is preferred, especially when the compression ratio is low, in order to reliably decode the watermark. The basic idea is to make the image distortion caused by the watermarking conforming to the image distortion caused by the rate-control distortion such that the watermark embedding capacity is maximized.

Table 1 contains example wavelet coefficient values before and after rate control with different φ (coefficients are obtained from 3HH subband of image "Baboon" with Jasper (see http://www.ece.uvic.ca/~mdadams/jasper/. The JasPer Project Home Page. The 3HH subband is chosen is because it is a median subband. Other subbands can be used as well depending on the applications.).

TABLE 1

| original value | φ = 1 | φ = 0.625 | φ = 0.5 | φ = 0.25 | φ = 0.1 | φ = 0.08 |
|---|---|---|---|---|---|---|
| 2 | 2 | 3 | 0 | 0 | 0 | 0 |
| 12 | 12 | 14 | 12 | 0 | 0 | 0 |
| 23 | 23 | 22 | 20 | 24 | 0 | 0 |
| −32 | −32 | −34 | −36 | −48 | −48 | 0 |
| 45 | 45 | 46 | 44 | 48 | 48 | 0 |
| −66 | −66 | −66 | −68 | −80 | −96 | −64 |
| 104 | 104 | 106 | 108 | 112 | 96 | 128 |

Table 2 contains a mapping of estimated quantization intervals for different bit-rate value.

TABLE 2

| bit-rate φ | estimated interval Q |
|---|---|
| >1 | 2 |
| 1~0.8 | 4 |
| 0.8~0.5 | 8 |
| 0.5~0.25 | 16 |
| 0.25~0.2 | 32 |
| 0.2~0.1 | 48 |
| <0.1 | 64 |

The watermark embedding system is shown in FIG. 28. The binary watermark w is embedded into selected codeblocks through the following steps:

Step 1. Adapt the quantization interval Q with the provided target bit-rate for a given rate control scheme. Table 2 shows an example mapping for this purpose. The mapping in Table 2 has been found to be suitable for the images used in the experiments, and JPEG2000. Experimentation may be required to select a particular mapping that is acceptable for different signals and the particular application for which the watermark and signal are to be used.

Step 2. Each watermark bit to be embedded is repeated M times for the purpose of error correction. M is also adaptively determined by φ. The watermark bits embedded in images with less repetition are more fragile to the image distortion and processing and a larger M is necessary to improve its robustness. Repetitive embedding as optional, depending on the needs of the particular watermarking application.

Step 3. Coefficients belonging to [−Q/2, Q/2] are excluded to bear watermark. Since these small coefficients represent the flat area of an image, it is difficult to use them to bear watermark without significantly distorting the image. Again, the selection of particular signal points to carry the watermark is optional, depending on the needs of the particular watermarking application.

Step 4. Positive coefficients are mapped to the nearest even multiples of Q, except 0, to embed bit "0" and the nearest odd multiples of Q to embed "1". Negative coefficients are mapped to the nearest even multiples of Q, except 0, to embed bit "1" and the nearest odd multiples of Q to embed bit "0". As shown in FIG. 29, the filled and empty circles represent the intended points for bit "1" and bit "0" respectively. The above operation of encoding bit "1"and "0" can be formulated by the following equations:

$$y = \begin{cases} \left[\left(\lfloor \frac{x}{2Q} \rfloor + 0.5\right) \times 2Q\right], & x > 2Q \\ \left[\left(\lceil \frac{x-Q}{2Q} \rceil\right) \times 2Q\right], & x < -Q \\ Q, & Q/2 \leq x \leq 2Q \\ -2Q, & -Q \leq x \leq -Q/2, \end{cases} \quad (45)$$

$$y = \begin{cases} \left[\left(\lceil \frac{x+Q}{2Q} \rceil\right) \times 2Q\right], & x > Q \\ \left[\left(\lfloor \frac{x}{2Q} \rfloor - 0.5\right) \times 2Q\right], & x < -2Q \\ 2Q, & Q/2 \leq x \leq Q \\ -Q, & -2Q \leq x \leq -Q/2. \end{cases} \quad (46)$$

Again, for the purposes described herein, the particular mapping of the coefficient within the quantization cells is separate, and optional, from the mapping referred to in step 1 above. Different mapping schemes can be used in step 4, as will be evident to those skilled in the art.

Watermark Retrieval

The watermark is decoded before dequantization during image decompression. In terms of the bit-rate of compressed image, we can infer the quantization interval Q from the bit rate the same way as the watermark embedding. The received coefficient y is mapped to the nearest multiple of Q. Then the watermark sequence is recovered by $$y = \begin{cases} 1, & d = (2n-1)Q \text{ or } d = (-2n)Q \\ 0, & d = (2n)Q \text{ or } d = (-2n+1)Q, \end{cases} \quad (47)$$

$$n = 1, 2, 3 \ldots$$

where d is the distance between the coefficient and the closest quantization point in terms of quantization interval Q. Finally the M consecutive decoded watermark bits are summed and a majority decision rule yields the output bits, which are the decoded watermark. For simplicity in the experiments, the consecutive bits encoding was used for the error correction coding. Nonetheless, other error correction coding techniques, such as for example block coding or convolutional coding, can be used as well.

Experimental Results

The performance of the adaptive watermarking scheme to various distortions is demonstrated by experiments on grayscale image. The JPEG2000 codec that is used to test the new watermarking system is Jasper, an implementation of the JPEG2000 encoder/decoder (see Jasper web page cited previously). The objective quality of the watermarked image is indicated by PSNR. The robustness under several intentional/unintentional attacks is represented by bit correct ratio (BCR). A 512×512 grayscale image "baboon" is used for demonstration. The testing results, not shown, for other images provide similar results.

Table 3 provides watermark detector results, measured in BCR, with various degrees of compression.

TABLE 3

| φ | PSNR without watermark | PSNR with watermark | Capacity (bit) | BCR |
|---|---|---|---|---|
| 1 | 60.89 dB | 50.38 dB | 220 | 100% |
| 0.625 | 45.63 dB | 43.58 dB | 220 | 100% |
| 0.5 | 40.83 dB | 38.07 dB | 373 | 100% |
| 0.25 | 30.59 dB | 28.83 dB | 373 | 100% |
| 0.1 | 23.91 dB | 23.41 dB | 251 | 100% |

In the depicted experiment, the watermark is embedded into the quantized coefficients of 3HH subband (5 decomposition levels are default for Jasper Codec). The original and watermarked images are shown in FIG. 30-37. In Table 3, the PSNR (peak-signal-to-noise-ratio) of compressed image with and without watermark as well as watermark embedding capacity (i.e. the maximal number of bits can be embedded) are shown in terms of various compression degrees. The results show that, the new bit-rate adaptive approach is superior to the fixed watermark strength scheme in that the new method takes advantage of the compression to improve the watermark embedding capacity while minimizes the image distortion on top of the compressed images with various bit-rates.

Robustness is tested on four conditions: JPEG baseline, JPEG 2000 compression, additive noise, and low-pass (noise-removal) filtering.

JPEG is widely used for image compression. In the case of JPEG compression with quality factor from 50% to 100%, the BCR is 100% for $\phi=0.1$ and nearly 100% for $\phi=0.25$ and 0.5. For $\phi=1$, the watermark scheme is reliable until the quality factor is smaller than 60%, as shown in FIG. 38.

Also we test the watermarked image with JPEG 2000 compression with different bit rate $\phi$. The results are shown in FIG. 39. For $\phi=1$ and $\phi=0.5$, the decoded watermark is reliable until the compression bit-rate smaller than 0.5 bpp.

Noise is the most common distortion in image processing and transmission. In the experiments, Gaussian noise with variance from 0.01 to 0.05 is added into the watermarked image. As shown in FIG. 40, The BCR is about 100% for $\phi=0.1$ and 0.25. For $\phi=1$ and 0.5, the detected watermark is not reliable when the noise variance is larger than 0.02.

Noise-removal filter is another common attack to the watermarked image. In the experiments, Wiener denoising filter is used to filter the watermarked image with estimated noise variance of 0.01, 0.02, 0.03, 0.04 and 0.05. Refer to FIG. 41, the BCR is 100% for $\phi=0.1$, around 95% for $\phi=0.5$ and 0.25, and 90% for $\phi=0.1$.

It can be seen from FIG. 38-41, the new algorithm is robust to these common attacks and distortions while keeping an acceptable visual quality of the image.

In the compression degree adaptive watermarking method, a binary watermark is embedded into middle frequency wavelet coefficients after quantization. During image decompression, the watermark is decoded without assistance from either the original image or the reference watermarks. The interval of quantization is designed based on the target bit rate, hence the strength of watermark is proportional to the compression ratio. In this way, not only does the watermark survive rate distortion, the tradeoff between visual quality and robustness is also balanced. The experiments show that the new algorithm has good performance in terms of both robustness and fidelity.

The above methods can be automatically implemented using either hardware or software or by a composite construction of both. When software is used to implement the methods, a computer program containing a set of instructions may be executed after being installed in a memory (temporary or permanent storage medium for containing instructions for direct access by a processor) in a data processor built in dedicated hardware, or after being installed in a multipurpose computer. When the instructions are implemented by software, programs constituting the software are installed in, for example, a multipurpose computer or a single-chip microcomputer. The term computer as used herein includes multipurpose computers, microcomputers, and data processors built in dedicated hardware, and other forms of computers. The creation of the computer programs that can instruct computers to carry out the methods described herein will be evident to those skilled in the art based upon the description provided herein, including the accompanying figures. Such computer programs, programmed computers (processors) form part of the embodiments described herein.

Figure 42:
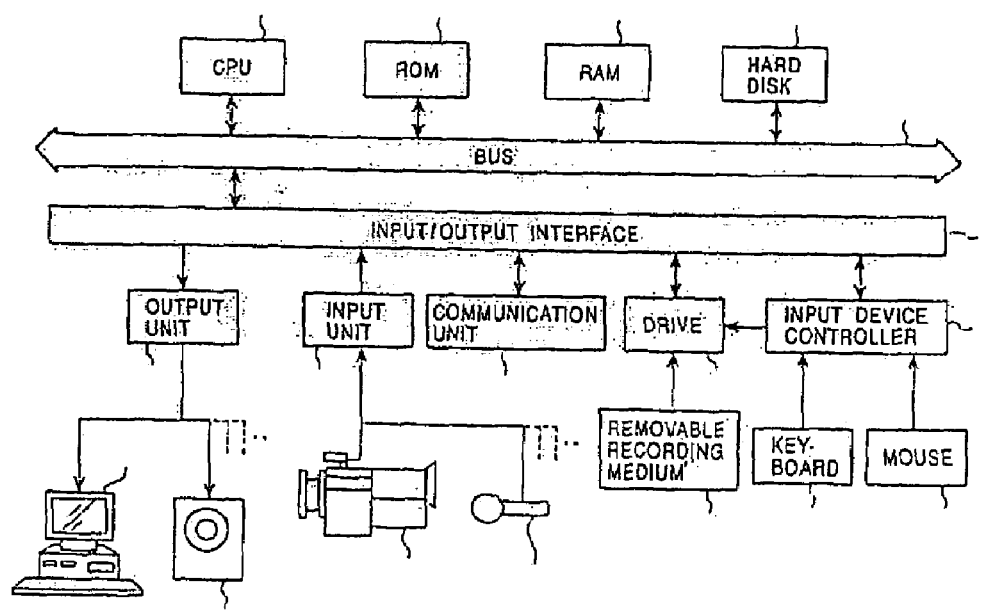
FIG. 42 is a sample hardware block diagram for the watermark embedding and decoding devices described herein, in accordance with a preferred embodiment of the present invention.

Referring to FIG. 42, an example of a system for implementing the methods described herein includes a central processing unit (CPU). The CPU may execute various types of application programs and an operating system. A read-only memory (ROM) stores a program that the CPU executes, or fixed data as arithmetic parameters. A random access memory (RAM) is used as a storage area for the program executed by the CPU and parameters that vary as required in processing of the program, and is used as a work area. The CPU, the ROM, the RAM and a hard disk are connected by a bus; so that, data can be mutually transferred. Also, data can be exchanged with various types of input/output units connected to an input/output interface. A keyboard and a mouse are operated for inputting various commands and data to the CPU by the user. The input commands and data are input via an input device controller. A drive is used to perform recording to or playback of a removable recording medium such as a floppy disk, a compact-disk read-only memory (CD-ROM), a magneto-optical (MO) disk, a digital versatile disk (DVD), a magnetic disk, or a semiconductor memory. The drive plays back a program or data from the removable recording medium, or stores a program or data on the removable recording medium.

When a command is input from the keyboard or the mouse to the CPU via the input/output interface, the CPU executes a program stored in the ROM in response to the input command. In the above embodiment, a picture to be digitally watermarked, or a picture having digital watermarks to be detected can be input from an input device such as a camera connected to an input unit for example, a data input device such as a scanner, or from the removable recording medium loaded into the drive such as the floppy disk, the CD-ROM, the MO disk, the DVD, the magnetic disk, or the semiconductor memory. In this system, audio data can be also input from a microphone. In addition, data received by a communication unit can be processed as picture data to be digitally watermarked or as picture data having digital watermarks to be detected. In addition to the program stored in the ROM after loading, into the RAM a program stored in the hard disk a program that is installed in the hard disk after being transferred from a satellite or a network and being received by the communication unit or a program that is installed in the hard disk after being read from the removable recording medium, which is loaded into the drive the CPU can execute the loaded program.

In the system the CPU executes processes in accordance with the above-described example in the embodiment, or processes in accordance with the above-described block diagrams and flowcharts. The CPU outputs the results of the processes, as required, by using the input/output interface and an output unit from a display unit such as a liquid crystal display or a cathode-ray tube or from a speaker. Also, processing data can be transmitted from the communication unit and can be stored in a recording medium such as the hard disk or the like.

Programs for executing the various methods can be recorded beforehand on the hard disk or the ROM as a recording medium built into the system. Alternatively, the programs can be stored (recorded) in the removable recording medium such as the floppy disk, the CD-ROM, the MO disk, the DVD, the magnetic disk, or the semiconductor memory. The removable recording medium of the above type can be provided as so-called "package software".

In addition to installation into a computer of the programs from the removable recording medium as described above, after transferring the programs by radio from a download site to a computer via a digital broadcasting satellite, or after transferring the programs by wire via a network such as a local area network or the Internet, the transferred programs can be received by the communication unit and can be installed in the hard disk of the computer.

It is to be noted that instructions forming part of the programs are not always time-sequentially executed in the order represented by a flowchart, and include processes (e.g., parallel processes or object-based processes) that are executed in parallel or separately.

In addition, the programs may be processed by a single computer or may be distributively processed by a plurality of computers. Also, the programs may be transferred and executed by a remote computer. The various forms of computers as described herein, in conjunction with the related instructions, form a processor for carrying out those instructions on the computer.

It will be understood by those skilled in the art that this description is made with reference to the preferred embodiment and that it is possible to make other embodiments employing the principles of the invention which fall within its spirit and scope as defined by the following claims.

We claim:

1. A watermark lookup table determining processor comprising:
    a) calculating means for each quantization cell, calculating a plurality of probabilities that a signal point to be embedded with a watermark value falls into the quantized cell, each probability being calculated for a different watermark value,
    b) selection means for selecting a quantization cell based on the calculated probabilities, and
    c) setting means for setting the LUT value of the selected quantization cell to the watermark value with the largest calculated probability for the selected quantization cell, subject to any run constraint, where run constraint is the largest number of consecutive identical watermark values in the table,
    wherein, the selection means and setting means repeat selecting and setting for the then remaining quantization cells, until all LUT values are set for all quantization cells.

2. The processing means of claim 1, wherein the calculation means, selection means and setting means comprise a computer and a computer program for controlling the computer, the program comprising instructions stored on a storage medium, the instructions for instructing the computer to carry out
    a) for each quantization cell, calculating a plurality of probabilities that a signal point to be embedded with a watermark value falls into the quantized cell, each probability being calculated for a different watermark value,
    b) selecting a quantization cell based on the calculated probabilities,
    c) setting the LUT value of the selected quantization cell to the watermark value with the largest calculated probability for the selected quantization cell, subject to any run constraint, where run constraint is the largest number of consecutive identical watermark values in the table,
    d) for the remaining quantization cells, repeating steps (b), (c) and (d).

3. The processor of claim 1, wherein the signal represents a multimedia work.

4. The processor of claim 1, wherein the signal represents an image.

5. The processor of claim 1, wherein the signal represents an audio work.

6. The processor of claim 1, wherein the signal represents an audiovisual work.

7. A watermark embedding processor for embedding a watermark in a signal, the processor comprising:
    a) quantization means for quantizing the signal using a uniform quantizer,
    b) embedding means for embedding the watermark in the quantized signal according to a lookup table ("LUT") with a plurality of values for use in association with a quantizer having a plurality of quantization cells to be used for embedding a watermark in a signal having varying values, and for determining the LUT by:
        i) for each quantization cell, calculating a plurality of probabilities that a signal point to be embedded with a watermark value falls into the quantized cell, each probability being calculated for a different watermark value,
        ii) selecting a quantization cell based on the calculated probabilities,
        iii) setting the LUT value of the selected quantization cell to the watermark value with the largest calculated probability for the selected quantization cell, subject to any run constraint, where run constraint is the largest number of consecutive identical watermark values in the table,
        iv) for the remaining quantization cells, repeating steps (ii), (iii) and (iv).

8. The processor of claim 7 further comprising:
    a) transform means for applying a transform to the signal prior to quantization,
    b) inverse transform means for applying an inverse transform to the quantized embedded transformed signal.

9. The processing means of claim 7, wherein the calculation means, selection means and setting means comprise a computer and a computer program for controlling the computer, the program comprising instructions stored on a storage medium, the instructions for instructing the computer to carry out:
    a) quantizing the signal using a uniform quantizer,
    b) embedding the watermark in the quantized signal according to a lookup table ("LUT") with a plurality of values for use in association with a quantizer having a plurality of quantization cells to be used for embedding a watermark in a signal having varying values, the lookup table determined by a method further comprising:
        i) for each quantization cell, calculating a plurality of probabilities that a signal point to be embedded with a watermark value falls into the quantized cell, each probability being calculated for a different watermark value, ii) selecting a quantization cell based on the calculated probabilities, iii) setting the LUT value of the selected quantization cell to the watermark value with the largest calculated probability for the selected quantization cell, subject to any run constraint, where run constraint is the largest number of consecutive identical watermark values in the table, iv) for the remaining quantization cells, repeating Steps (ii), (iii) and (iv).

10. The processor of claim 7, wherein the signal represents a multimedia work.

11. The processor of claim 7, wherein the signal represents an image.

12. The processor of claim 7, wherein the signal represents an audio work.

13. The processor of claim 7, wherein the signal represents an audiovisual work.

14. A watermark embedding processor for embedding a watermark in a signal, the processor comprising:
  a) quantization means for quantizing the signal using a uniform quantizer,
  b) embedding means for embedding the watermark in the quantized signal in accordance with a lookup table ("LUT") with a plurality of values for use in association with a quantizer having a plurality of quantization cells to be used for embedding a watermark in a signal having varying values, and for determining the LUT by a method further comprising:
    i) for each quantization cell, calculating a plurality of probabilities that a signal point to be embedded with a watermark value falls into the quantized cell, each probability being calculated for a different watermark value,
    ii) selecting a quantization cell based on the calculated probabilities,
    iii) setting the LUT value of the selected quantization cell to the watermark value with the largest calculated probability for the selected quantization cell, subject to any run constraint, where run constraint is the largest number of consecutive identical watermark values in the table,
    iv) for the remaining quantization cells, repeating steps (ii), (iii) and (iv).

15. The processor of claim 14, wherein the signal represents a multimedia work.

16. The processor of claim 14, wherein the signal represents an image.

17. The processor of claim 14, wherein the signal represents an audio work.

18. The processor of claim 14, wherein the signal represents an audiovisual work.

* * * * *